United States Patent
Prakash et al.

(10) Patent No.: US 11,166,251 B2
(45) Date of Patent: Nov. 2, 2021

(54) DELIVERY TIME WINDOWS FOR LOW LATENCY COMMUNICATIONS

(71) Applicant: QUALCOMM Incorporated, San Diego, CA (US)

(72) Inventors: Rajat Prakash, San Diego, CA (US); Vinay Joseph, San Diego, CA (US); Peerapol Tinnakornsrisuphap, San Diego, CA (US); Karl Georg Hampel, Hoboken, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/807,111

(22) Filed: Mar. 2, 2020

(65) Prior Publication Data

US 2020/0205107 A1    Jun. 25, 2020

Related U.S. Application Data

(63) Continuation of application No. 16/582,671, filed on Sep. 25, 2019.
(Continued)

(51) Int. Cl.
*H04W 56/00* (2009.01)
*H04L 1/00* (2006.01)

(52) U.S. Cl.
CPC ....... *H04W 56/0045* (2013.01); *H04L 1/0018* (2013.01)

(58) Field of Classification Search
CPC .................. H04W 56/0045; H04L 1/0018
See application file for complete search history.

(56) References Cited

U.S. PATENT DOCUMENTS

| 5,797,085 | A | * | 8/1998 | Beuk | G08C 19/28 |
| | | | | | 370/328 |
| 5,903,735 | A | * | 5/1999 | Kidder | H04L 29/06 |
| | | | | | 370/233 |

(Continued)

OTHER PUBLICATIONS

Craciunas S.S., et al., "Scheduling Real-Time Communication in IEEE 802.1 Qbv Time Sensitive Networks", Real-Time Networks and Systems, ACM, 2 Penn Plaza, Suite 701 New York NY 10121-0701 USA, Oct. 19, 2016 (Oct. 19, 2016), pp. 183-192, XP058300427, DOI: 10.1145/2997465.2997470, ISBN: 978-1-4503-4787-7, p. 184, left-hand column, last paragraph; figure 1, p. 186; figure 2(b).

(Continued)

*Primary Examiner* — Ayaz R Sheikh
*Assistant Examiner* — Tarell A Hampton
(74) *Attorney, Agent, or Firm* — Holland & Hart, LLP

(57) ABSTRACT

Generally, the described techniques provide for a device determining or receiving signaling including a packet delivery time window configuration that indicates delivery windows within which transmissions may be held and/or delivery opportunities within which communications are expected to be transmitted. For example, the device may identify a packet delivery time window configuration for communications with another device. The packet delivery window configuration may indicate a periodicity, offset, start time, end time, and/or duration of the delivery windows, among other information. Based on the identified packet delivery time window configuration, the device may delay transmission of the data packet (e.g., for the duration of one or more configured delivery windows). At, for example, the end of the respective delivery window, the device may deliver the data packet to a network device for which the information of the data packet is to be used.

30 Claims, 12 Drawing Sheets

Related U.S. Application Data

(60) Provisional application No. 62/739,096, filed on Sep. 28, 2018.

(56) References Cited

U.S. PATENT DOCUMENTS

| | | | | |
|---|---|---|---|---|
| 6,009,077 | A * | 12/1999 | Firoiu | H04L 47/724 370/230 |
| 6,205,150 | B1 * | 3/2001 | Ruszczyk | H04L 47/564 370/412 |
| 6,363,429 | B1 * | 3/2002 | Ketcham | H04L 29/06027 709/231 |
| 6,671,260 | B1 * | 12/2003 | Engstrand | H04Q 11/0478 370/238 |
| 7,061,929 | B1 * | 6/2006 | Eberle | H04L 12/5692 370/423 |
| 7,349,332 | B1 * | 3/2008 | Srinivasan | H04L 45/7453 370/229 |
| 7,634,287 | B1 * | 12/2009 | Bambos | H04L 1/002 455/522 |
| 2003/0088690 | A1 * | 5/2003 | Zuckerman | H04L 47/26 709/232 |
| 2005/0058149 | A1 * | 3/2005 | Howe | H04L 47/10 370/428 |
| 2005/0213587 | A1 * | 9/2005 | Cho | H04L 47/564 370/395.42 |
| 2007/0195789 | A1 * | 8/2007 | Yao | H04L 47/50 370/395.21 |
| 2008/0291830 | A1 * | 11/2008 | Pernu | H04W 72/02 370/236 |
| 2009/0193484 | A1 * | 7/2009 | Zhang | H04N 21/2402 725/112 |
| 2009/0285217 | A1 * | 11/2009 | Frink | H04N 21/4385 370/394 |
| 2010/0131769 | A1 | 5/2010 | Homma | |
| 2010/0325506 | A1 * | 12/2010 | Cai | H04W 72/042 714/748 |
| 2013/0237777 | A1 * | 9/2013 | Patel | A61B 5/02055 600/301 |
| 2014/0369194 | A1 * | 12/2014 | Friedman | H04L 47/245 370/235 |
| 2018/0330453 | A1 | 11/2018 | Lai et al. | |
| 2019/0132149 | A1 * | 5/2019 | Mangin | H04L 47/724 |
| 2019/0239262 | A1 * | 8/2019 | Wang | H04W 52/0261 |
| 2020/0107285 | A1 | 4/2020 | Prakash et al. | |

OTHER PUBLICATIONS

International Search Report and Written Opinion—PCT/US2019/053317—ISA/EPO—dated Dec. 17, 2019.

Nokia et al., "TSN-QoS Framework", 3GPP Draft; S2-188101-TSN-QOSFramework-V2, 3rd Generation Partnership Project (3GPP), Mobile Competence Centre ; 650, Route Des Lucioles ; F-06921 Sophia-Antipolis Cedex ; France, vol. SA WG2, No. Sophia Antipolis; Aug. 20, 2018-Aug. 24, 2018, Aug. 14, 2018 (Aug. 14, 2018), XP051537040, 6 Pages, Retrieved from the Internet: URL:http://www.3gpp.org/ftp/tsg%5Fsa/WG2%5FArch/TSGS2%5F128BIS%5FSophia%5FAntipolis/Docs/S2%2D188101.

Qualcomm Incorporated: "Architecture Implications of Supporting TSN in RAN", 3GPP Draft; R2-1813604 IOT and TSN Implications for RAN2, 3rd Generation Partnership Project (3GPP), Mobile Competence Centre; 650, Route Des Lucioles ; F-06921 Sophia-Antipolis Cedex ; France, vol. RAN WG2, No. Chengdu, China; Oct. 8, 2018-Oct. 12, 2018, Sep. 27, 2018 (Sep. 27, 2018), XP051523104, 5 Pages, Retrieved from the Internet: URL:http://www.3gpp.org/ftp/tsg%5Fran/WG2%5FRL2/TSGR2%5F103bis/Docs/R2%2D1813604%2Ezip [retrieved on Sep. 27, 2018], section 2.1-section 3.2, figures 1-3.

* cited by examiner

DELIVERY TIME WINDOWS FOR LOW LATENCY COMMUNICATIONS

CROSS REFERENCE

The present Application for Patent is a Continuation of U.S. patent application Ser. No. 16/582,671 by PRAKASH et al., entitled "DELIVERY TIME WINDOWS FOR LOW LATENCY COMMUNICATIONS" filed Sep. 25, 2019, which claims the benefit of U.S. Provisional Patent Application No. 62/739,096 by PRAKASH et al., entitled "DELIVERY TIME WINDOWS FOR LOW LATENCY COMMUNICATIONS," filed Sep. 28, 2018, assigned to the assignee hereof, and each of which is expressly incorporated by reference herein.

BACKGROUND

The following relates generally to wireless communications, and more specifically to delivery time windows for low latency communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code-division multiple access (CDMA), time-division multiple access (TDMA), frequency-division multiple access (FDMA), orthogonal frequency-division multiple access (OFDMA), or discrete Fourier transform-spread-orthogonal frequency-division multiplexing (DFT-S-OFDM). A wireless multiple-access communications system may include a number of base stations or network access nodes, each simultaneously supporting communication for multiple communication devices, which may be otherwise known as user equipment (UE).

A wireless multiple-access communications system may include a number of base stations or network access nodes (or both) that each simultaneously support communication for multiple devices, which may be otherwise known as UEs. In some cases, various applications (e.g., motion control, discrete manufacturing) may utilize relatively strict reliability, latency, and jitter requirements. As such, improved apparatuses that support delivery time windows for low latency communications are desired.

SUMMARY

The described techniques relate to improved methods, systems, devices, and apparatuses that support delivery time windows for low latency communications. Generally, the described techniques provide for a device (e.g., such as a user equipment (UE), a base station, one or more adapter functions, and/or any other wireless communications device) determining or receiving signaling including a packet delivery time window configuration that may indicate delivery windows within which transmissions may be performed and/or delivery opportunities within which communications are expected to be transmitted. For example, the device may identify a packet delivery time window configuration for communications with another device (e.g., for communications between a UE and a base station or an adapter function). The packet delivery window configuration may indicate a periodicity, offset, start time, end time, and/or duration (e.g., length) of the delivery windows, among other information.

Based on the identified packet delivery time window configuration, the device may delay transmission of the data packet (e.g., for the duration of one or more configured delivery windows). For example, when the device receives a data packet within the duration of one of the delivery windows, the device may delay the data packet for at least part of, if not until the end of, the duration of the respective delivery window, among other possibilities. At, for example, the end of the respective delivery window, the device may deliver the data packet to a network device for which the information of the data packet is to be used (e.g., a UE may deliver a held data packet containing application data from a model of the UE to a corresponding application of the UE).

A method of wireless communications is described. The method may include identifying a packet delivery time window configuration for communications of a traffic type, receiving, before a delivery opportunity that is based on the packet delivery time window configuration, a data packet of the traffic type, delaying transmission of the data packet based on the packet delivery time window configuration and receiving the data packet before the delivery opportunity, and transmitting, after delaying transmission and based on the delivery opportunity, the data packet to a network device.

An apparatus for wireless communications is described. The apparatus may include a processor, memory in electronic communication with the processor, and instructions stored in the memory. The instructions may be executable by the processor to cause the apparatus to identify a packet delivery time window configuration for communications of a traffic type, receive, before a delivery opportunity that is based on the packet delivery time window configuration, a data packet of the traffic type, delay transmission of the data packet based on the packet delivery time window configuration and receiving the data packet before the delivery opportunity, and transmit, after delaying transmission and based on the delivery opportunity, the data packet to a network device.

Another apparatus for wireless communications is described. The apparatus may include means for identifying a packet delivery time window configuration for communications of a traffic type, receiving, before a delivery opportunity that is based on the packet delivery time window configuration, a data packet of the traffic type, delaying transmission of the data packet based on the packet delivery time window configuration and receiving the data packet before the delivery opportunity, and transmitting, after delaying transmission and based on the delivery opportunity, the data packet to a network device.

A non-transitory computer-readable medium storing code for wireless communications is described. The code may include instructions executable by a processor to identify a packet delivery time window configuration for communications of a traffic type, receive, before a delivery opportunity that is based on the packet delivery time window configuration, a data packet of the traffic type, delay transmission of the data packet based on the packet delivery time window configuration and receiving the data packet before the delivery opportunity, and transmit, after delaying transmission and based on the delivery opportunity, the data packet to a network device.

Some examples of the method, apparatuses, and non-transitory computer-readable medium described herein may further include operations, features, means, or instructions for determining a delivery time window based on the packet delivery time window configuration, where transmitting the data packet may be based on the delivery time window.

Some examples of the method, apparatuses, and non-transitory computer-readable medium described herein may further include operations, features, means, or instructions for determining a time interval associated with the delivery opportunity based on an end time of the delivery time window, where transmitting the data packet includes. In some examples of the method, apparatuses, and non-transitory computer-readable medium described herein, receiving the data packet may include operations, features, means, or instructions for receiving the data packet within the delivery time window. In some examples of the method, apparatuses, and non-transitory computer-readable medium described herein, the packet delivery time window configuration indicates a periodicity of the delivery time window, a start time of the delivery time window, an end time of the delivery time window, an offset of the delivery time window relative to a time, or a duration of the delivery time window, or any combination thereof.

Some examples of the method, apparatuses, and non-transitory computer-readable medium described herein may further include operations, features, means, or instructions for receiving, from a radio access node, an indication of a periodicity of the delivery time window, a start time of the delivery time window, an end time of the delivery time window, an offset of the delivery time window relative to a time, or a duration of the delivery time window, or any combination thereof, where determining the delivery time window may be based on receiving the indication. In some examples of the method, apparatuses, and non-transitory computer-readable medium described herein, receiving the indication may include operations, features, means, or instructions for receiving the indication via a radio protocol message.

In some examples of the method, apparatuses, and non-transitory computer-readable medium described herein, transmitting the data packet may include operations, features, means, or instructions for transmitting the data packet within a time interval of the delivery opportunity. In some examples of the method, apparatuses, and non-transitory computer-readable medium described herein, transmitting the data packet may include operations, features, means, or instructions for transmitting the data packet within a delivery window of a set of delivery windows associated with communications of the traffic type.

In some examples of the method, apparatuses, and non-transitory computer-readable medium described herein, transmitting the data packet may include operations, features, means, or instructions for transmitting the data packet during an end portion of a delivery window based on the packet delivery time window configuration. In some examples of the method, apparatuses, and non-transitory computer-readable medium described herein, transmitting the data packet may include operations, features, means, or instructions for transmitting the data packet before or after the delivery opportunity.

Some examples of the method, apparatuses, and non-transitory computer-readable medium described herein may further include operations, features, means, or instructions for determining a delay budget associated with communications of the traffic type and determining the delivery opportunity based on the delay budget, where transmitting the data packet may be based on determining the delivery opportunity. Some examples of the method, apparatuses, and non-transitory computer-readable medium described herein may further include operations, features, means, or instructions for determining a delivery time window for communications of the traffic type based on the delay budget, where transmitting the data packet may be based on the delivery time window. In some examples of the method, apparatuses, and non-transitory computer-readable medium described herein, delaying transmission of the data packet may include operations, features, means, or instructions for buffering the data packet before transmission based on the receiving the data packet before the delivery opportunity.

Some examples of the method, apparatuses, and non-transitory computer-readable medium described herein may further include operations, features, means, or instructions for identifying a packet arrival window associated with the network device and determining the delivery opportunity based on an end duration of the packet arrival window, where transmitting the data packet may be based on determining the delivery opportunity.

Some examples of the method, apparatuses, and non-transitory computer-readable medium described herein may further include operations, features, means, or instructions for receiving a packet arrival time window configuration indicating at least one of a user plane function (UPF) packet arrival time window configuration, a radio access network (RAN) packet arrival time window configuration, or a UE packet arrival time window configuration, where determining the delivery opportunity may be based on receiving the packet arrival time window configuration.

Some examples of the method, apparatuses, and non-transitory computer-readable medium described herein may further include operations, features, means, or instructions for determining the delivery opportunity based on a packet arrival time associated with the network device and a delay budget for communications of the traffic type, where transmitting the data packet may be based on determining the delivery opportunity.

DETAILED DESCRIPTION

Figure 1:
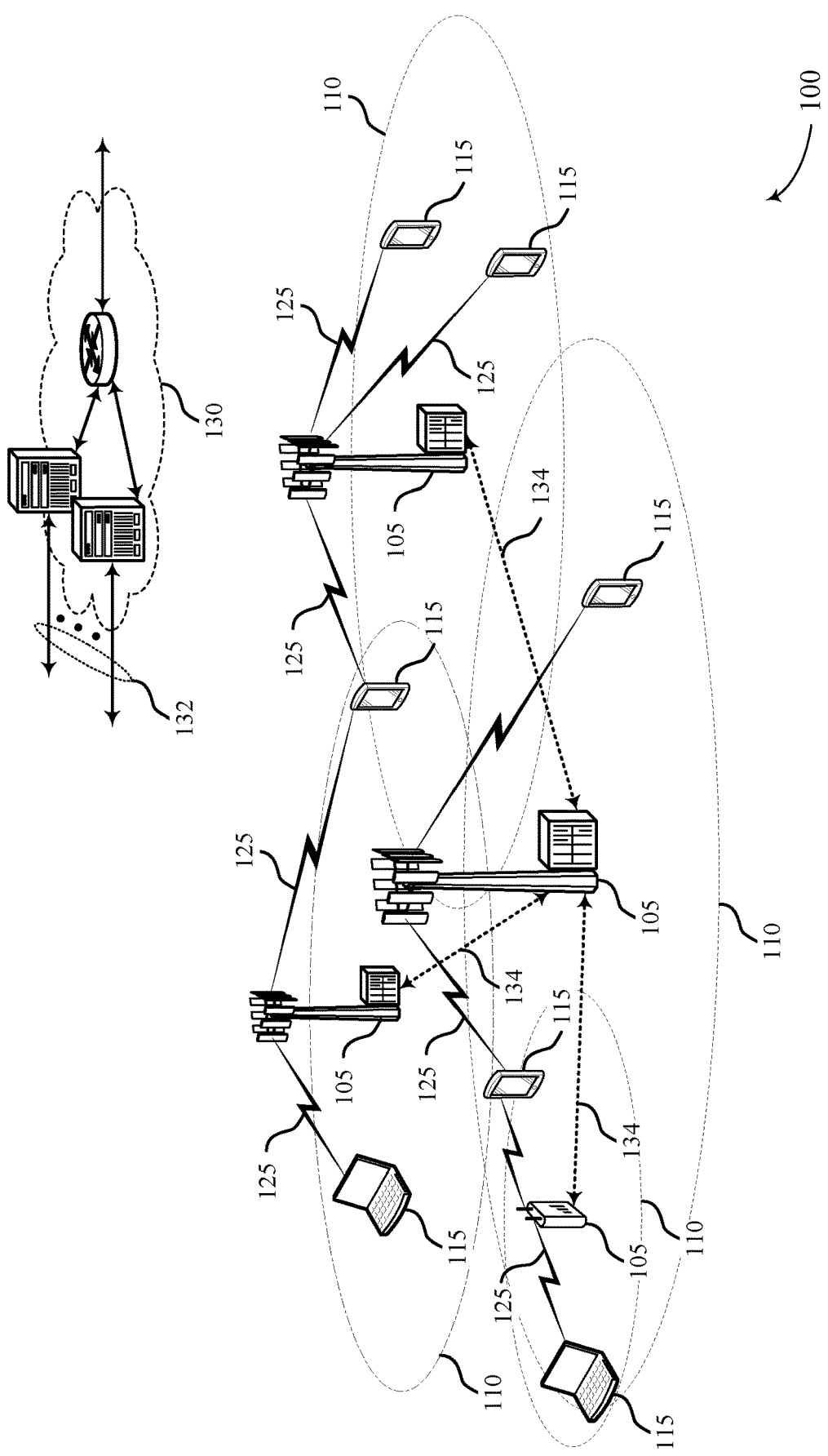
FIG. 1 illustrates an example of a system for wireless communications that supports delivery time windows for low latency communications in accordance with aspects of the present disclosure.

Some wireless communications systems may be used to facilitate communications in networks that rely on relatively strict timing synchronization of network components, sometimes referred to as time sensitive networking (TSN) systems. Such systems may be used to support, for example, factory automation. Some TSN systems specify relatively stringent quality of service (QoS) parameters, such as latency, jitter, and reliability requirements for data traffic (e.g., less than 1 ms latency and $10^{-6}$ reliability). In some cases, such data traffic may be supported in a wireless communications system using a high reliability service, such as an ultra-reliable low latency communication (URLLC) service.

In the wireless communications system (e.g., carrying TSN communications), a QoS requirement for a particular QoS flow may define one or more target packet delay budgets (PDB). The target PDB may set a target latency or total time delay for communications between a user equipment (UE) and the core network, among other examples, of the wireless communications system below which communicated data packets may be used. In the case of a downlink transmission, the PDB may include a first delay component incurred between the core network (e.g., from a user plane function (UPF), session management function (SMF), or other adapter function) and a radio access node (at, e.g., a base station). The PDB may also include a second delay component incurred between the base station and the UE. Together, this total PDB defines a target latency from the UPF to the UE via the base station. The PDB may similarly define a target latency from the UE to the UPF or SMF via the base station in the case of an uplink transmission. If the total delay in communicating a data packet exceeds the total PDB defined by the PDB configuration, the data packet may not be used and may be ignored.

In some situations, however, jitter in the wireless communications system may cause the total delay to vary for communications between the UE, base station, and/or UPF, among the other devices in the wireless communications system. In some cases, jitter may cause transmissions to be received by a receiving device (e.g., the UE, or another device within the wireless communications system) earlier than the transmission is expected to be received. However, a transmission that is received early may be received during a packet delivery window for which the receiving device delays data transmissions until the end of the packet delivery window. Thus, transmissions received early (e.g., due to jitter) may cause a queue of transmissions. This may reduce the efficiency (e.g., utilization of time and frequency resources) with which these transmissions may be communicated.

Techniques are discussed herein that provide for determining or receiving signaling at a receiving device a packet delivery time window configuration that indicates delivery windows within which transmissions may be held and/or delivery opportunities within which communications are expected to be transmitted. For example, a packet delivery time window configuration may provide for a configuration of multiple delivery windows, where each of the delivery windows may have a duration from a start time to an end time. In some cases, one or more of the delivery windows may be separated by a delivery window offset. As described herein, packets received during one of the delivery windows may be held (e.g., until the end time of the respective delivery window) at which point the packet may be transmitted during a delivery opportunity. These delivery opportunities may, in some cases, coincide with the delivery window offsets between each of the delivery windows.

In some cases, a network device (e.g., a UE, a base station, one or more adapter functions, or any other wireless communications device) may determine a packet delivery window configuration for transmitting and receiving data packets along the transmission timeline. The packet delivery window configuration may indicate a periodicity, offset, start time, end time, and/or duration (e.g., length) of the delivery windows.

In some cases, a data packet that is received within the duration of one of the delivery windows may be held (e.g., for a holding time) and delivered later (e.g., at the end time of the respective delivery window within which the data packet was received). The holding time may be the period time from which the data packet is received in a particular delivery window to the end time of the respective delivery window. According to the packet delivery window configuration, the UE (or, e.g., the UPF or other adapter function at another node of the wireless communications system) may determine a delivery time at which to deliver a data packet corresponding to a particular application. The data packet may then be delivered (e.g., during or after the end time in a corresponding delivery opportunity).

Particular aspects of the subject matter described herein may be implemented to realize one or more advantages. The described techniques may support improvements in delivery time windows for low latency communications, decreasing signaling overhead, and improving reliability, among other advantages. As such, supported techniques may include improved network operations and, in some examples, may promote network efficiencies, among other benefits.

Aspects of the disclosure are initially described in the context of a wireless communications system. Aspects of the disclosure are also described in the context of transmission timelines and process flows. Aspects of the disclosure are further illustrated by and described with reference to apparatus diagrams, system diagrams, and flowcharts that relate to delivery time windows for low latency communications.

FIG. 1 illustrates an example of a wireless communications system 100 that supports delivery time windows for low latency communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency-division duplexing (FDD), time-division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency-division multiplexing or discrete Fourier transform-spread-OFDM (DFT-S-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time-division multiplexing (TDM) techniques, frequency-division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Some wireless communications systems (e.g., the wireless communications system 100) may be used to facilitate communications in networks that rely on relatively strict timing synchronization of network components, sometimes referred to as TSN systems. Such systems may be used to support, for example, factory automation. Some TSN systems specify relatively stringent quality of service (QoS) parameters, such as, jitter, reliability targets (e.g., packet error loss), and/or delay targets (e.g., PDBs, latency targets, etc.) for data traffic. For example, a TSN system may have targets such as a latency of less than 1 ms and a packet error rate less than $10^{-6}$. In some cases, such data traffic may be supported in a wireless communications system using a high reliability service, such as a URLLC service.

In the wireless communications system 100 (e.g., carrying TSN communications), a QoS requirement for a particular QoS flow may define a target PDB. The target PDB may set a target latency or total time delay for communications between a UE 115 and the core network 130 of the wireless communications system 100 below which communicated data packets may be used. In the case of a downlink transmission, the PDB may include a first delay component incurred between the core network 130 (e.g., from a UPF, SMF, or other adapter function) and a radio access node (at a base station 105 for example). The PDB may also include a second delay component incurred between the base station 105 and the UE 115. Together, this total PDB defines a target latency from the UPF to the UE 115 via the base station 105. The PDB may similarly define a target latency from the UE 115 to the UPF or SMF via the base station 105 in the case of an uplink transmission. If the total delay in communicating a data packet exceeds the total PDB defined by the PDB configuration, the data packet may not be used and may be ignored.

According to some aspects, the total PDB or one or more delay components of the total PDB may be divided into one or more additional components or delay budgets. For example, one or more delay budgets may be divided within the radio access network (RAN). In some cases, the RAN may be or include a central unit (CU) and a distributed unit (DU). The delay budget configuration (e.g., the PDB configuration indicating a total PDB or one or more components of the total PDB) may include one or more delay budgets (e.g., variable and/or non-variable delay budgets) incurred between the CU and the DU. For instance, the delay budget configuration may indicate a balanced budget (e.g., an even split delay budget) between the CU, DU, and the UE 115. In such cases, the delay budget configuration may indicate a division of the delay budget between a base station 105-a of the RAN and the UE 115 into respective delay budgets for each of the CU to DU and DU to UE 115. In other examples, delay budgets between the RAN and the UE 115 may be unbalanced (e.g., unevenly split) between the CU, DU, and the UE 115 or may be defined separate from the total PDB and may be a separate component of the total PDB.

In some situations, however, jitter in the wireless communications system 100 may cause the total delay to vary for communications between the UE 115, base station 105, UPF, among the other devices (e.g., CU, DU) in the wireless communications system 100. In some cases, jitter may cause transmissions to be received by a receiving device (e.g., the UE 115, or another device within the wireless communications system 100) earlier than the transmission is expected to be received. However, a transmission that is received early may be received during a packet delivery window for which the receiving device delays data transmissions until the end of the packet delivery window. Thus, transmissions received early due to jitter may cause a queue of transmissions to be transmitted at the end of the packet delivery window. This may reduce the efficiency (e.g., utilization of time and frequency resources) with which these transmissions may be communicated.

Techniques are discussed herein that provide for determining or receiving signaling (e.g., at the receiving device) a packet delivery time window configuration that indicates delivery windows within which transmissions may be held and/or delivery opportunities within which communications are expected to be transmitted. For example, a packet delivery time window configuration may indicate a periodicity, offset, and/or duration for one or more delivery windows for delivery of packets to the receiving device. The packet delivery time window configuration may implicitly (e.g., based on the knowledge of the delivery windows) explicitly also indicate the periodicity, offset, and/or duration for one or more delivery opportunity during which the receiving device may transmit the corresponding data transmissions.

Figure 2:
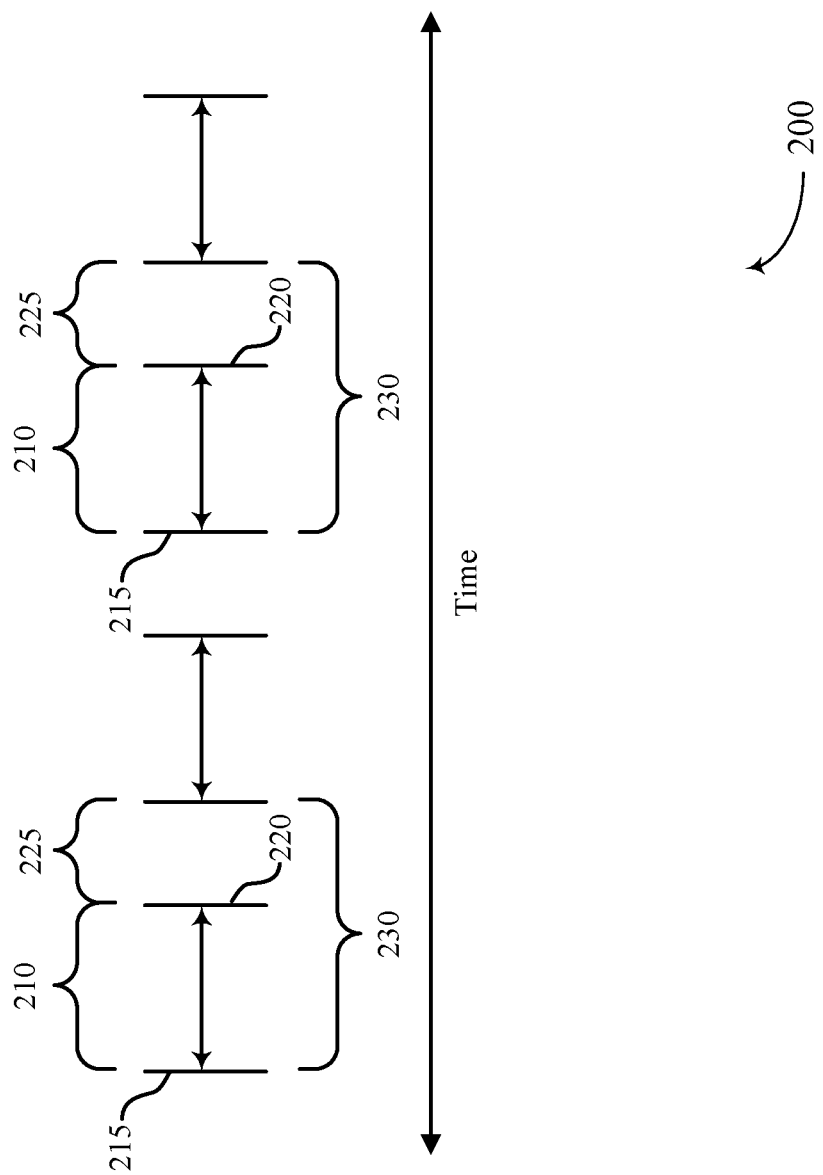
FIG. 2 illustrates an example of a transmission timeline that supports delivery time windows for low latency communications in accordance with aspects of the present disclosure.

FIG. 2 illustrates an example of a transmission timeline 200 associated with a wireless communications system that supports delivery time windows for low latency communications in accordance with aspects of the present disclosure. In some examples, the transmission timeline 200 may implement aspects of the wireless communications system 100 as described with reference to FIG. 1. The transmission timeline 200 illustrates a transmission scheme for downlink low latency transmissions communications in a low latency communications system, which may be implemented by aspects of the wireless communications system 100 as described with reference to FIG. 1. The low latency communications system is described with reference to a radio access node (e.g., at a base station 105) and a UE 115, which may be examples of the corresponding devices as described with reference to FIG. 1. The UE may include a modem, which may receive data packets from the radio access node and deliver the received data packets to a corresponding application hosted by the UE that may use the information in the received data packet.

It is to be understood that references to specific RATs (e.g., LTE or NR) are provided for illustrative purposes only and different RATs not specifically referred to herein may be used interchangeably with those described herein. Further, while operations may be described as performed by one device to another device in one of uplink or downlink, it is to be understood that the functions may be performed similarly for uplink and downlink and by each of the different devices described herein. The operations also generally describe communications between one transmitting device and receiving device, but may be similarly applied for multiple devices in any combination, for example, to coordinate between different ports at different bridges of different receiving devices from one transmitting device.

The transmission timeline 200 illustrates a transmission scheme for low latency communications between a transmitting device and a receiving device. In this example (e.g., downlink), the transmitting device is described herein as a base station and the receiving device is described herein as a UE. It is to be understood, however, that in different RATs, devices, nodes, functions (e.g., different adapter functions), and the like may perform each of the respective functions and similar techniques may be applicable to uplink communications as well. The transmission timeline 200 illustrates a timeline for receiving transmissions at a modem, which may, for example, be implemented at the UE, or another wireless node in the system. The modem may deliver data to an application, for example, hosted at the UE.

A base station may also communicate with a core network (e.g., a data network). In some cases, the core network entity may include various adapter functions, such as a SMF, a UPF, an access and mobility function (AMF), and/or a control plane function (CPF). In some cases, the SMF may provide session management services for UEs. The SMF may communicate with different nodes in the wireless communications system to signal to the nodes, for example, different QoS procedures to be performed for different QoS standards. In some cases, the UPF may handle user information such as PDCP, RLC, MAC, and PHY communications. In other cases, and as contemplated below, the functions of the UPF (as well as any of the other adapter functions) may be performed at another device within the system. In some cases, the adapter functions may be communicatively coupled in the core network entity. In other cases, the adapter functions may be located at separate nodes in the system.

The transmission timeline 200 shows multiple delivery windows 210, where each of the delivery windows 210 has a duration from a start time 215 to an end time 220. In some cases, one or more of the delivery windows 210 may be separated by a delivery window offset. The delivery window offset may, in some cases, be constant or variable between each of the delivery windows 210 with respect to a global clock (e.g., 0.5 ms, or any other constant or variable offset value with respect to the global clock). As described herein, packets received during one of the delivery windows 210 may be held until the end time 220 of the respective delivery window 210, at which point the packet may be transmitted during a delivery opportunity 225. These delivery opportunities 225 may coincide with the delivery window offsets between each of the delivery windows 210.

In some cases, the UE may determine a packet delivery window configuration for transmitting and receiving data packets along the transmission timeline 200. Additionally or alternatively, the packet delivery window configuration may be determined at another device, for example, by a UPF (or other adapter function) at a base station or another wireless device with the wireless communications system. The packet delivery window configuration may indicate a periodicity, offset, start time 215 (e.g., expressed as a timestamp with respect to a reference time), end time 220 (e.g., expressed as a timestamp with respect to a reference time), and/or duration (e.g., length) of the delivery windows 210. Similarly, explicitly or implicitly (e.g., by knowledge of the periodicity, offset, and/or duration of the delivery windows 210), the packet delivery window configuration may indicate a periodicity, offset, start and end times, and/or duration of the delivery windows 210. The periodicity of the delivery windows 210 and the delivery opportunities 225 may be defined by a period 230 including one or more delivery windows 210 and one or more 310 delivery opportunities 225. The period 230 may be fixed, for example, as may have been negotiated for the wireless communications system.

In some cases, a data packet that is received within the duration of one of the delivery windows 210 may be held for a holding time and delivered later (e.g., at the end time 220 of the respective delivery window 210 within which the data packet was received). The holding time may, in some cases, be the period time from which the data packet is received in a particular delivery window 210 to the end time 220 of the respective delivery window 210. The data packet may then be delivered after the end time 220 in a corresponding delivery opportunity 225. In some cases, the UE may buffer the data packet until the subsequent delivery opportunity 225 (e.g., store the data packet in a buffer for the duration of the holding time). Alternatively, a data packet may be received outside of the delivery windows 210, in which case the data packet may be delivered, for example, based on configured priorities (e.g., the data packet may be delivered as it is received or delivered, subject to a delay based on a configured priority that may not be subject to holding).

That is, according to the packet delivery window configuration, the UE (or, e.g., the UPF or other adapter function at another node of the wireless communications system) may determine a delivery time at which to deliver a data packet corresponding to a particular application. As described herein, the packet delivery time for the data packet may be determined based on an arrival time at which the UE received the data packet as compared to the delivery windows 210. The delivery windows 210 may be time intervals configured according to the packet delivery window configuration, a packet arrival time configuration, a PDB configuration for a QoS flow with which the data packet is associated (the PDB configuration determined and signaled to the UE, e.g., by one of the adapter functions at a node of the wireless communications system), and/or one more configurable parameters (e.g., the periodicity, offset, and duration of the delivery windows 210 and the delivery opportunities 225). The packet arrival time configuration may include one or more indications of a packet arrival time (e.g., a UPF packet arrival time) using, for example, a period and offset/phase, or an indication of RAN packet arrival times (e.g., indicates using a period and offset/phase).

In some cases, the UE may determine the delivery time for the data packet based on the end time 220 of the delivery window 210 in which the UE received the data packet. As shown in FIG. 2, the end time 220 of the delivery window 210 may define a time at which the delivery opportunity 225 may begin. For example, for a data packet received by the modem of the UE during the delivery window 210 (received from, e.g., the UPF via the base station), the modem may deliver the data packet to the corresponding application during the same delivery window 210 (e.g., before or following the end time 220). In some cases, the duration of the delivery window 210 may be configured to be equal to the PDB (as indicated by the PDB configuration). Alternatively, a delivery opportunity may not be provided, in which case the UE may continue to hold the data packet, or, in other cases, may discard the data packet.

Additionally or alternatively, the UE may determine the delivery time for the data packet based on a sum of the arrival time at which the UE received the data packet (e.g., determined based on the packet arrival time configuration) and the PDB corresponding to the QoS flow with which the data packet is associated. In this case, a delay may follow the end time of the delivery window 210 before the modem of the UE delivers the data packet to the application.

Figure 3:
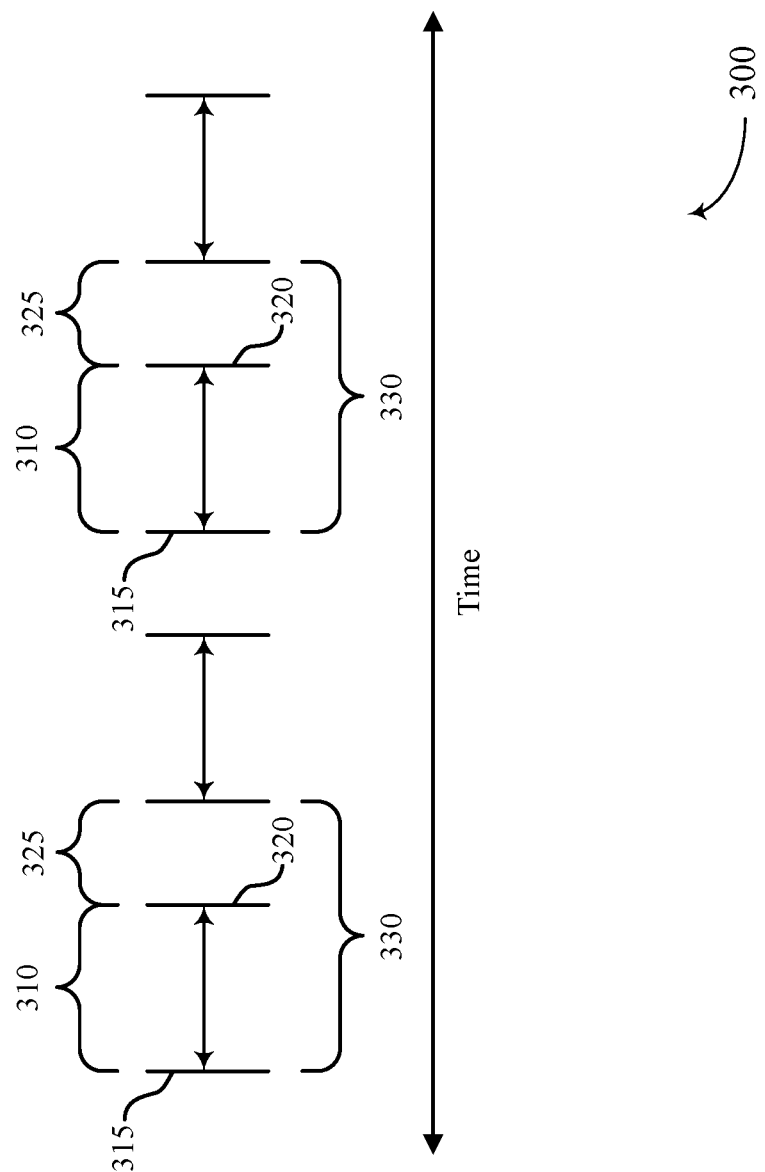
FIG. 3 illustrates an example of a transmission timeline that supports delivery time windows for low latency communications in accordance with aspects of the present disclosure.

FIG. 3 illustrates an example of a transmission timeline 300 that supports delivery time windows for low latency communications in accordance with aspects of the present disclosure. In some examples, the transmission timeline 300 may implement aspects of the wireless communications system as described with reference to FIGS. 1 and 2. The transmission timeline 300 illustrates a transmission scheme for uplink low latency transmissions communications in a low latency communications system, which may be implemented by aspects of the wireless communications system 100 or transmission timeline 200 as described with reference to FIGS. 1 and 2. The low latency communications system is described with reference to a radio access node at (e.g., at a base station 105) and a UE 115, which may be examples of the corresponding devices as described with reference to FIGS. 1 and 2. The UE may include a modem, which may receive data packets from the radio access node and deliver the received data packets to a corresponding application hosted by the UE that may use the information in the received data packet.

It is to be understood that references to specific RATs (e.g., LTE or NR) are provided for illustrative purposes only and different RATs not specifically referred to herein may be used interchangeably with those described herein. Further, while operations may be described as performed by one device to another device in one of uplink or downlink, it is to be understood that the functions may be performed similarly for uplink and downlink and by each of the different devices described herein. The operations also generally describe communications between one transmitting device and receiving device, but may be similarly applied for multiple devices in any combination, for example, to coordinate between different ports at different bridges of different receiving devices from one transmitting device.

The transmission timeline 300 illustrates a transmission scheme for low latency communications between a transmitting device and a receiving device. In this example (e.g., uplink), the transmitting device is described herein as the UE and the responding device is described herein as the UPF. It is to be understood, however, that in different RATs, devices, nodes, functions (e.g., different adapter functions), and the like may perform each of the respective functions and similar techniques may be applicable to uplink communications as well. The transmission timeline 300 illustrates a timeline for receiving transmissions from a modem, which may, for example, be implemented at the UE, or another wireless node in the system. The modem may deliver data to an application, for example, hosted at the UE.

A base station may also communicate with a core network (e.g., a data network). In some cases, the core network entity may include various adapter functions, such as a SMF, a UPF, an AMF, and/or a CPF. In some cases, the SMF may provide session management services for UEs. The SMF may communicate with different nodes in the wireless communications system to signal to the nodes, for example, different QoS procedures to be performed for different QoS standards. In some cases, the UPF may handle user information such as PDCP, RLC, MAC, and PHY communications. In other cases, and as contemplated below, the functions of the UPF (as well as any of the other adapter functions) may be performed at another device within the system. In some cases, the adapter functions may be communicatively coupled in the core network entity. In other cases, the adapter functions may be located at separate nodes in the system.

The transmission timeline 300 shows multiple delivery windows 310, where each of the delivery windows 310 has a duration from a start time 315 to an end time 320. In some cases, one or more of the delivery windows 310 may be separated by a delivery window offset. The delivery window offset may, in some cases, be constant or variable between each of the delivery windows 210 with respect to a global clock (e.g., 0.5 ms, or any other constant or variable offset value with respect to the global clock). As described herein, packets received during one of the delivery windows 310 may be held until the end time 320 of the respective delivery window 310, at which point the packet may be transmitted during a delivery opportunity 325. These delivery opportunities 325 may coincide with the delivery window offsets between each of the delivery windows 310.

In some cases, the UPF may determine a packet delivery window configuration for transmitting and receiving data packets along the transmission timeline 300. Additionally or alternatively, the packet delivery window configuration may be determined at another device, for example, by the UE, another adapter function, at a base station, or another wireless device within the wireless communications system. In some cases, the packet delivery window configuration may be signaled via a radio protocol message. The packet delivery window configuration may indicate a periodicity, offset, start time 315 (e.g., expressed as a timestamp with respect to a reference time), end time 320 (e.g., expressed as a timestamp with respect to a reference time), and/or duration (e.g., length) of the delivery windows 310. Similarly, explicitly or implicitly (e.g., by knowledge of the periodicity, offset, and/or duration of the delivery windows 310), the packet delivery window configuration may indicate a periodicity, offset, start and end times, and/or duration of the delivery windows 310 or delivery opportunities 325. The periodicity of the delivery windows 310 and the delivery opportunities 325 may be defined by a period 330 including one delivery window 310 and one delivery opportunity 325. The period 330 may be constant, for example, as may have been negotiated for the wireless communications system.

In some cases, a data packet that is received within the duration of one of the delivery windows 310 may be held for a holding time and delivered at the end time 320 of the respective delivery window 310 within which the data packet was received. The holding time may be the period time from which the data packet is received in a particular delivery window 310 to the end time 320 of the respective delivery window 310. The data packet may then be delivered to the core network after the end time 320 in a corresponding delivery opportunity 325. In some cases, the UPF may buffer the data packet until the subsequent delivery opportunity 325 (e.g., store the data packet in a buffer for the duration of the holding time). Alternatively, a data packet may be received outside of the delivery windows 310, in which case the data packet may be delivered, for example, based on configured priorities (e.g., the data packet may be delivered as it is received or delivered, subject to a delay based on a configured priority that may not be subject to holding).

That is, according to the packet delivery window configuration, the UPF (or other adapter function at another node of the wireless communications system) may determine a delivery time at which to deliver a data packet corresponding to a particular application. As described herein, the packet delivery time for the data packet may be determined based on an arrival time at which the UPF received the data packet as compared to the delivery windows 310. The delivery windows 310 may be time intervals configured according to the packet delivery window configuration, a packet arrival time configuration, a PDB configuration for a QoS flow with which the data packet is associated (the PDB configuration determined by the UPF, or signaled to the UPF, e.g., by another adapter function at a node of the wireless communications system, such as the SMF), and/or one more configurable parameters (e.g., the periodicity, offset, and duration of the delivery windows 310 and the delivery opportunities 325). The packet arrival time configuration may include one or more indications of a packet arrival time (e.g., a UE packet arrival time) using, for example, a period and offset/phase, or an indication of RAN packet arrival times (e.g., indicates using a period and offset/phase).

In some cases, the UPF may determine the delivery time for the data packet based on the end time 320 of the delivery window 310 in which the UPF received the data packet. As shown in FIG. 3, the end time 320 of the delivery window 310 may define a time at which the delivery opportunity 325 may begin. For example, for a data packet received by the UPF during the delivery window 310 (received from, e.g., the UE via the base station), the UPF may deliver the data packet to the core network during the delivery window 310 following the end time 320. In some cases, the duration of the delivery window 310 may be configured to be equal to the PDB (as indicated by the PDB configuration). Alternatively, a delivery opportunity may not be provided, in which case the UPF may continue to hold the data packet, or, in other cases, may discard the data packet.

Additionally or alternatively, the UPF may determine the delivery time for the data packet based on a sum of the arrival time at which the UPF received the data packet (e.g., determined based on the packet arrival time configuration) and the PDB corresponding to the QoS flow with which the data packet is associated. In this case, a delay may follow the end time of the delivery window 310 before UPF delivers the data packet to the core network.

Figure 4:
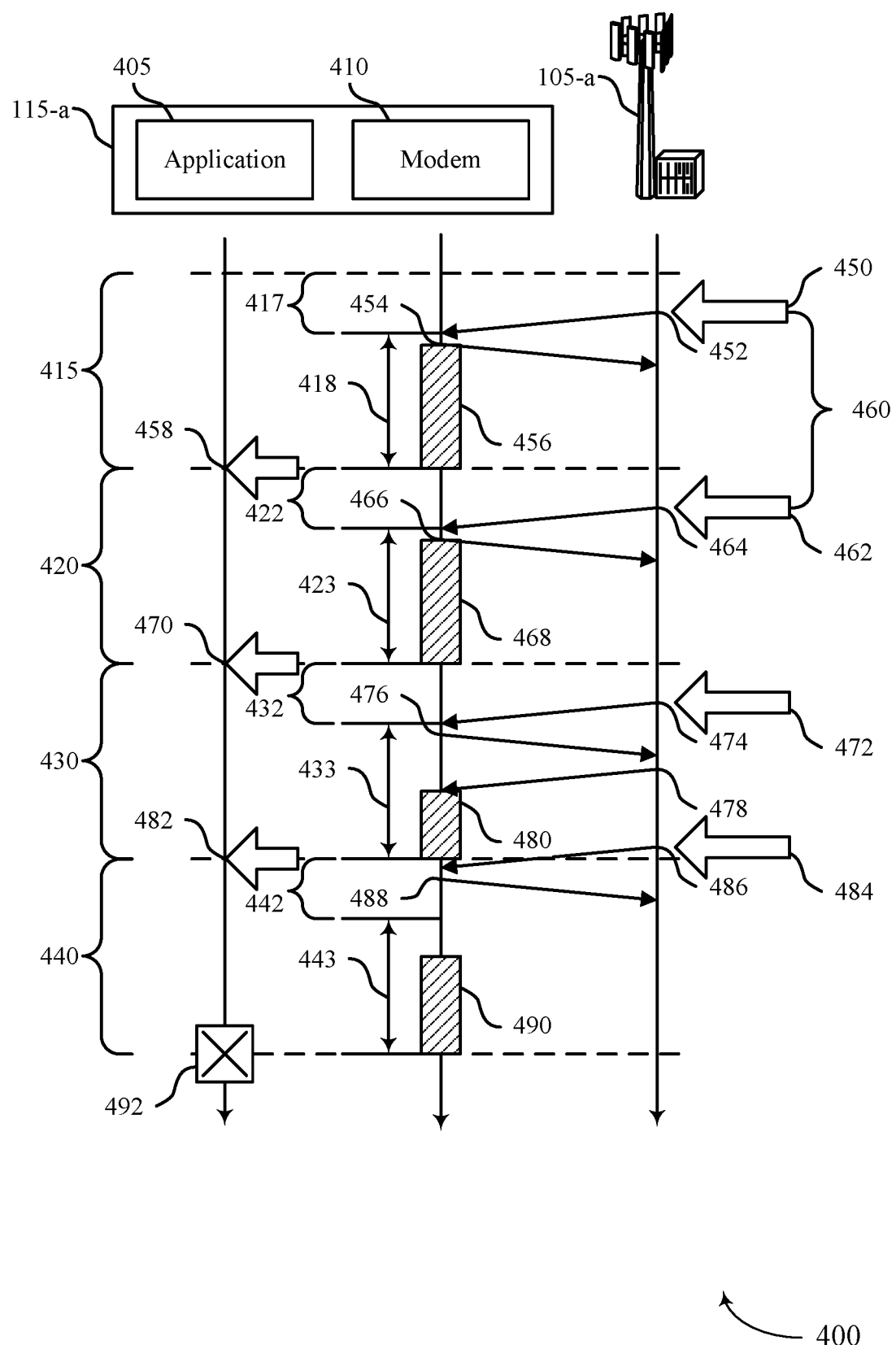
FIG. 4 illustrates an example of a process flow that supports delivery time windows for low latency communications in accordance with aspects of the present disclosure.

FIG. 4 illustrates an example of a process flow 400 that supports delivery time windows for low latency communications in accordance with aspects of the present disclosure. In some examples, the process flow 400 may implement aspects of the wireless communications systems 100, a transmission timeline 200 associated with a wireless communications system, and a transmission timeline 300 associated with a wireless communications system. The process flow 400 includes a base station 105-a and a UE 115-a, where the UE 115-b includes an application 405 and a modem 410, and each may be examples of the corresponding devices described with reference to FIGS. 1 through 3. Different RATs, devices, nodes, functions, and the like may perform similar functions. The process flow 400 illustrates a transmission scheme for downlink low latency transmissions communications in a low latency communications system, which may implement aspects of the wireless communications system 100 as described with reference to FIGS. 1 through 3.

It is to be understood that references to specific RATs (e.g., LTE or NR) are provided for illustrative purposes only and different RATs not specifically referred to herein may be used interchangeably with those described herein. Further, while the process flow 400 shows an example of downlink communications, it is to be understood that the functions may be performed similarly for uplink and downlink and by each of the different devices described herein. The operations also generally describe communications between one transmitting device and receiving device, but may be similarly applied for multiple devices in any combination, for example, to coordinate between different ports at different bridges of different receiving devices from one transmitting device.

The process flow 400 shows a transmission scheme for low latency communications between a transmitting device and a receiving device. In this example (e.g., downlink), the transmitting device is described herein as the base station 105-a and the receiving device is described herein as the UE 115-a, where the UE 115-a includes the application 405 and the modem 410. It is to be understood, however, that in different RATs, devices, nodes, functions (e.g., different adapter functions), and the like may perform each of the respective functions and similar techniques may be applicable to uplink communications as well. The process flow 400 shows the UE 115-a receiving transmissions at the modem 410. The modem 410 may deliver data to the application 405 hosted at the UE 115-a.

The process flow 400 includes a first period 415, a second period 420, a third period 430, and a fourth period 440. Initially, the modem 410 may identify a packet delivery time window configuration (e.g., a packet delivery window configuration) for communications of a traffic type (e.g., traffic categories). Traffic types may include or refer to communications traffic having different reliability thresholds, different latency thresholds, different services, or various combinations thereof. According to the packet delivery time window configuration, in each of the periods include a corresponding delivery time window and delivery opportunity. The modem 410 may determine the delivery time windows based on the packet delivery time window configuration. In some cases, the modem 410 may determine a delay budget (e.g., the PDB 460) associated with communications of the traffic type, and may determine the delivery opportunity based on the delay budget. In some cases, the modem 410 may determine the delivery time windows based the delay budget.

In some cases, the modem 410 may determine a time interval associated with the delivery opportunity based on an end time of the delivery time window. In some cases, the packet delivery time window configuration may indicate a periodicity of the delivery time windows, a start time of the delivery time windows, an end time of the delivery time windows, an offset of the delivery time windows relative to a time, and/or a duration of the delivery time windows. In some cases, the modem 410 may receive from the base station 105-a (e.g., via a radio access node of the base station 105-a) an indication of the periodicity of the delivery time window, the start time of the delivery time window, the end time of the delivery time window, the offset of the delivery time window relative to a time, and/or the duration of the delivery time window, and may determine the delivery time window based on receiving the indication. In some cases, the modem 410 may receive the indication via a radio protocol message.

For example, the first period 415 includes a first delivery opportunity 417 and a first delivery time window 418, the second period 420 includes a second delivery opportunity 422 and a second delivery time window 423, the third period 430 includes a third delivery opportunity 432 and a third delivery time window 433, and the fourth period 440 includes a fourth delivery opportunity 442 and a fourth delivery time window 443. As described herein, data packets received during one of the delivery time windows may be held until the end time of the respective delivery time window, at which point the data packet may be transmitted during the following delivery opportunity.

Additionally or alternatively, the modem 410 may identify a packet arrival window associated with the UE 115-a. Based on the packet arrival window, the modem 410 may determine the delivery opportunity based on an end duration of the packet arrival window. Additionally or alternatively, the modem 410 may determine the delivery opportunity based on a packet arrival time associated with the UE 115-a and the delay budget for communications of the traffic type for which the packet delivery time window configuration may have been identified. In some cases, the modem 410 may receive a packet arrival time window configuration indicating a UPF packet arrival time window configuration, a RAN packet arrival time window configuration, and/or a UE packet arrival time window configuration, and may determine the delivery opportunity based on receiving the packet arrival time window configuration.

At 450, the base station 105-a may identify a first data packet to be transmitted to the modem 410. In some cases, the base station 105-a may receive data packets from the core network periodically (e.g., at a defined periodicity). The base station 105-a may, for example, receive the first data packet from a core network, the first data packet including information for the application 405.

At 452, the base station 105-a may transmit to the modem 410, and the modem 410 may receive from the base station 105-a, the first data packet, as may have been identified at 450. As shown, the modem 410 receives the first data packet before the first delivery opportunity 417, where the first delivery opportunity 417 is based on the packet delivery time window configuration. In some cases, the first data packet may be of a traffic type for which the packet delivery time window configuration may have been identified.

At 454, the modem 410 may transmit to the base station 105-a, and the base station 105-a may receive from the modem 410, an acknowledgement. The acknowledgment may indicate, for example, that the first data packet was successfully received at 452.

At 456, the modem 410 may delay transmission of the first data packet based on the packet delivery time window configuration and having received the first data packet before the second delivery opportunity 422. In some cases, the modem 410 may buffer the first data packet, as may have been received at 452. In some cases, the modem 410 may buffer the first data packet before transmitting the first data packet based on having received the first data packet during the first delivery time window 418 before an upcoming delivery opportunity (e.g., the second delivery opportunity 422). The modem 410 may maintain the first data packet in a buffer for a holding time until a time at which the modem 410 may deliver the first data packet, for example, following the end time of the first delivery time window 456.

At 458, the modem 410 may deliver (e.g., transmit) to the application 405, and the application 405 may receive from the modem 410, the first data packet. The modem 410 may deliver the first data packet during the time interval as may have been determined to be associated with the second delivery opportunity 422. As shown, the application 405 delivers the first data packet at the beginning of the second delivery opportunity 422 following the end time of the first delivery time window 418. Alternatively, the modem 410 may deliver (e.g., transmit) the first data packet during an end portion of the first delivery time window 418 based on the packet delivery time window configuration.

At 462, following the PDB 460, the base station 105-a may identify a second data packet to be transmitted to the modem 410. The base station 105-a may, for example, receive the second data packet from the core network, the second data packet including information for the application 405.

At 464, the base station 105-a may transmit to the modem 410, and the modem 410 may receive from the base station 105-a, the second data packet, as may have been identified at 462. As shown, the modem 410 receives the second data packet before the third delivery opportunity 432, where the third delivery opportunity 432 is based on the packet delivery time window configuration. In some cases, the second data packet may be of a traffic type for which the packet delivery time window configuration may have been identified.

At 466, the modem 410 may transmit to the base station 105-a, and the base station 105-a may receive from the modem 410, an acknowledgement. The acknowledgment may indicate, for example, that the second data packet was successfully received at 464.

At 468, the modem 410 may delay transmission of the second data packet based on the packet delivery time window configuration and having received the second data packet before the third delivery opportunity 432. In some cases, the modem 410 may buffer the second data packet, as may have been received at 464. In some cases, the modem 410 may buffer the second data packet before transmitting the second data packet based on having received the second data packet during the second delivery time window 423 before an upcoming delivery opportunity (e.g., the third delivery opportunity 432). The modem 410 may maintain the second data packet in the buffer for a holding time until a time at which the modem 410 may deliver the second data packet, for example, following the end time of the second delivery time window 423.

At 470, the modem 410 may deliver to the application 405, and the application 405 may receive from the modem 410, the second data packet. As shown, the application 405 delivers the second data packet at the beginning of the third delivery opportunity 432 following the end time of the second delivery time window 423.

At 472, the base station 105-a may identify a third data packet to be transmitted to the modem 410. The base station 105-a may, for example, receive the third data packet from the core network, the third data packet 450 including information for the application 405.

At 474, the base station 105-a may transmit to the modem 410, and the modem 410 may receive from the base station 105-a, the third data packet, as may have been identified at 472. In this example, the transmission of the third data packet may encounter interference or blockage, or otherwise may not be successfully received at the modem 410 such that the modem 410 is able to decode sufficient information from the third data packet (e.g., based on a threshold).

At 476, the modem 410 may transmit to the base station 105-a, and the base station 105-a may receive from the modem 410, a negative acknowledgement. The negative acknowledgment may indicate, for example, that the third data packet was not successfully received at 474.

At 478, the base station 105-a may retransmit to the modem 410, and the modem 410 may receive from the base station 105-a, the third data packet, as may have been identified at 472. The base station 105-a may retransmit the third data packet based on having received the negative acknowledgement from the modem 410 at 476. As shown, the modem 410 receives the third data packet before the fourth delivery opportunity 442, where the fourth delivery opportunity 442 is based on the packet delivery time window configuration. In some cases, the first data packet may of a traffic type of the traffic type for which the packet delivery time window configuration may have been identified.

At 480, the modem 410 may delay transmission of the third data packet based on the packet delivery time window configuration and having received third first data packet before the fourth delivery opportunity 442. In some cases, the modem 410 may buffer the third data packet, as may have been received in the retransmission at 478. In some cases, the modem 410 may buffer the third data packet before transmitting the third data packet based on having received the third data packet during the third delivery time window 433 before an upcoming delivery opportunity (e.g., the fourth delivery opportunity 442). The modem 410 may maintain the third data packet in the buffer for a holding time until a time at which the modem 410 may deliver the third data packet, for example, following the end time of the third delivery time window 433. As shown in this example, the holding time that the third data packet is relatively shorter than the holding time for the first, second, and fourth data packets due to the modem 410 having received the third data packet in the retransmission at 478.

At 482, the modem 410 may deliver to the application 405, and the application 405 may receive from the modem 410, the third data packet. As shown, the application 405 delivers the third data packet at the beginning of the fourth delivery opportunity 442 following the end time of the third delivery time window 433.

At 484, the base station 105-*a* may identify a fourth data packet to be transmitted to the modem 410. The base station 105-*a* may, for example, receive the fourth data packet from the core network, the fourth data packet including information for the application 405. In this example, the base station 105-*a* may receive the fourth data packet relatively earlier than the other data packets with respect to the fourth period 440. As shown, the base station 105-*a* identifies the fourth data packet during a time that overlaps with the third period 430.

At 486, the base station 105-*a* may transmit to the modem 410, and the modem 410 may receive from the base station 105-*a*, the fourth data packet, as may have been identified at 484. Because, in this example, the fourth data packet was received early, the modem 410 receives the fourth data packet during the fourth delivery time window 443. As the modem 410 receives the fourth data packet during the fourth delivery time window 443, rather than during a delivery opportunity, the modem 410 may not deliver the fourth data packet to the application 405.

At 488, the modem 410 may transmit to the base station 105-*a*, and the base station 105-*a* may receive from the modem 410, an acknowledgement. The acknowledgment may indicate, for example, that the fourth data packet was successfully received at 486.

At 490, the modem 410 may buffer the fourth data packet, as may have been received at 488. The modem 410 may maintain the fourth data packet in the buffer for a holding time until a time at which the modem 410 may deliver the second data packet. However, as in this example, the modem 410 receives the fourth data packet during the fourth delivery time window 443, rather than during a delivery opportunity, the modem 410 may not deliver the fourth data packet to the application 405. In this case, the modem 410 may, for example, discard the fourth data packet to clear the packet from the buffer.

At 492, the modem 410 may not deliver the fourth data packed to the application 405. In this example, the modem 410 receives the fourth data packet during the fourth delivery time window 443, rather than during a delivery opportunity, and thus the modem 410 may not deliver the fourth data packet to the application 405. Therefore, the application 405 may not receive the fourth data packet at this point.

Figure 5:
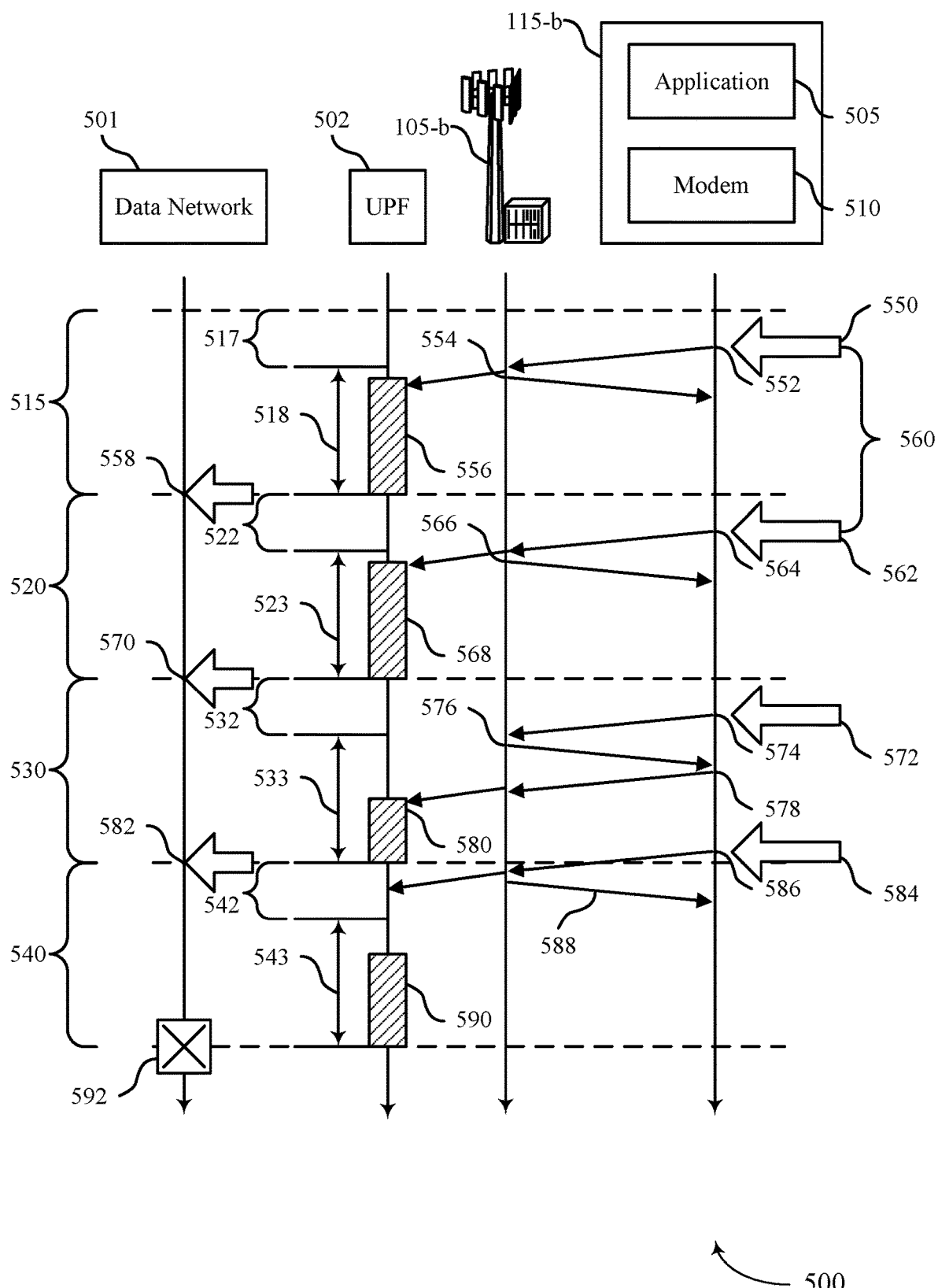
FIG. 5 illustrates an example of a process flow that supports delivery time windows for low latency communications in accordance with aspects of the present disclosure.

FIG. 5 illustrates an example of a process flow 500 that supports delivery time windows for low latency communications in accordance with aspects of the present disclosure. In some examples, the process flow 500 may implement aspects of the wireless communications systems 100, a transmission timeline 200 associated with a wireless communications system, and a transmission timeline 300 associated with a wireless communications system, and process flow 400 as described with reference to FIGS. 1 through 4. The process flow 500 includes a data network 501 (e.g., a core network), a UPF 502 base station 105-*b* and a UE 115-*b*, where the UE 115-*b* includes application 505 and a modem 510, and each may be examples of the corresponding devices described with reference to FIGS. 1 through 3. The different RATs, devices, nodes, functions, and the like may perform similar functions. The process flow 500 illustrates a transmission scheme for uplink low latency transmissions communications in a low latency communications system, which may implement aspects of the wireless communications system 100 as described with reference to FIGS. 1 through 4.

It is to be understood that references to specific RATs (e.g., LTE or NR) are provided for illustrative purposes only and different RATs not specifically referred to herein may be used interchangeably with those described herein. Further, while the process flow 500 shows an example of uplink communications, it is to be understood that the functions may be performed similarly for uplink and downlink and by each of the different devices described herein. The operations also generally describe communications between one transmitting device and receiving device, but may be similarly applied for multiple devices in any combination, for example, to coordinate between different ports at different bridges of different receiving devices from one transmitting device.

The process flow 500 shows a transmission scheme for low latency communications between a transmitting device and a receiving device. In this example (e.g., uplink), the transmitting device is described herein as the UE 115-*b* and the receiving device is described herein as the UPF 502, where the UE 115-*b* includes the application 505 and the modem 510. It is to be understood, however, that in different RATs, devices, nodes, functions (e.g., different adapter functions), and the like may perform each of the respective functions and similar techniques may be applicable to uplink communications as well. For example, the process flow 500 includes the UPF 502, although the functions of the UPF 502 may be performed similarly by another adapter function or another wireless device.

The process flow 500 includes a first period 515, a second period 520, a third period 530, and a fourth period 540. Initially, the UPF 502 may identify a packet delivery time window configuration (e.g., a packet delivery window configuration) for communications of a traffic type. According to the packet delivery time window configuration, in each of the periods include a corresponding delivery time window and delivery opportunity. The UPF 502 may determine the delivery time windows based on the packet delivery time window configuration. In some cases, the UPF 502 may determine a delay budget (e.g., the PDB 560) associated with communications of the traffic type, and may determine the delivery opportunity based on the delay budget. In some cases, the UPF 502 may determine the delivery time windows based the delay budget.

In some cases, the UPF 502 may determine a time interval associated with the delivery opportunity based on an end time of the delivery time window. In some cases, the packet delivery time window configuration may indicate a periodicity of the delivery time windows, a start time of the delivery time windows, an end time of the delivery time windows, an offset of the delivery time windows relative to a time, and/or a duration of the delivery time windows. In some cases, the UPF 502 may receive from the UE 115-*b* (e.g., via a radio access node of the base station 105-*b*) an indication of the periodicity of the delivery time window, the start time of the delivery time window, the end time of the delivery time window, the offset of the delivery time window relative to a time, and/or the duration of the delivery time window, and may determine the delivery time window based on receiving the indication. In some cases, the UPF 502 may receive the indication via a radio protocol message.

For example, the first period 515 includes a first delivery opportunity 517 and a first delivery time window 518, the second period 520 includes a second delivery opportunity 522 and a second delivery time window 523, the third period 530 includes a third delivery opportunity 532 and a third delivery time window 533, and the fourth period 540 includes a fourth delivery opportunity 542 and a fourth delivery time window 543. As described herein, data packets received during one of the delivery time windows may be held until the end time of the respective delivery time window, at which point the data packet may be transmitted during a the following delivery opportunity.

Additionally or alternatively, the UPF 502 may identify a packet arrival window associated with the data network 501. Based on the packet arrival window, the UPF 502 may determine the delivery opportunity based on an end duration of the packet arrival window. Additionally or alternatively, the UPF 502 may determine the delivery opportunity based on a packet arrival time associated with the data network 501 and the delay budget for communications of the traffic type for which the packet delivery time window configuration may have been identified. In some cases, the UPF 502 may receive a packet arrival time window configuration indicating a UPF packet arrival time window configuration, a RAN packet arrival time window configuration, and/or a UE packet arrival time window configuration, and may determine the delivery opportunity based on receiving the packet arrival time window configuration.

At 550, the UE 115-*b* may identify a first data packet to be transmitted to the UPF 502. In some cases, the UE 115-*b* may identify data packets to transmit periodically (e.g., at a defined periodicity).

At 552, the UE 115-*b* may transmit to the UPF 502 via the base station 105-*b*, and the UPF 502 may receive from the UE 115-*b*, the first data packet, as may have been identified at 550. As shown, the UPF 502 receives the first data packet before the first delivery opportunity 517, where the first delivery opportunity 517 is based on the packet delivery time window configuration. In some cases, the first data packet may of a traffic type of the traffic type for which the packet delivery time window configuration may have been identified.

At 554, the base station 105-*b* may transmit to the UE 115-*b*, and the UE 115-*b* may receive from the base station 105-*b*, an acknowledgement. The acknowledgment may indicate, for example, that the first data packet was successfully received at 552.

At 556, the UPF 502 may delay transmission of the first data packet based on the packet delivery time window configuration and having received the first data packet before the second delivery opportunity 522. In some cases, the UPF 502 may buffer the first data packet, as may have been received at 552. In some cases, the UPF 502 may buffer the first data packet before transmitting the first data packet based on having received the first data packet during the first delivery time window 518 before an upcoming delivery opportunity (e.g., the second delivery opportunity 522). The UPF 502 may maintain the first data packet in a buffer for a holding time until a time at which the UPF 502 may deliver the first data packet, for example, following the end time of the first delivery time window 556.

At 558, the UPF 502 may deliver (e.g., transmit) to the data network 501, and the data network 501 may receive from the UPF 502, the first data packet. The UPF 502 may deliver the first data packet during the time interval as may have been determined to be associated with the second delivery opportunity 522. As shown, the application 505 delivers the first data packet at the beginning of the second delivery opportunity 522 following the end time of the first delivery time window 518. Alternatively, the UPF 502 may deliver (e.g., transmit) the first data packet during an end portion of the first delivery time window 518 based on the packet delivery time window configuration.

At 562, following the PDB 560, the UE 115-*b* may identify a second data packet to be transmitted to the UPF 502. The UE 115-*b* may, for example, receive the second data packet from the core network, the second data packet including information for the data network 501.

At 564, the UE 115-*b* may transmit to the UPF 502 via the base station 105-*b*, and the UPF 502 may receive from the UE 115-*b*, the second data packet, as may have been identified at 562. As shown, the UPF 502 receives the second data packet before the third delivery opportunity 532, where the third delivery opportunity 532 is based on the packet delivery time window configuration. In some cases, the second data packet may of a traffic type of the traffic type for which the packet delivery time window configuration may have been identified.

At 566, the base station 105-*b* may transmit to the UE 115-*b*, and the UE 115-*b* may receive from the base station 105-*b*, an acknowledgement. The acknowledgment may indicate, for example, that the second data packet was successfully received at 564.

At 568, the UPF 502 may delay transmission of the second data packet based on the packet delivery time window configuration and having received the second data packet before the third delivery opportunity 532. In some cases, the UPF 502 may buffer the second data packet, as may have been received at 564. In some cases, the UPF 502 may buffer the second data packet before transmitting the second data packet based on having received the second data packet during the second delivery time window 523 before an upcoming delivery opportunity (e.g., the third delivery opportunity 532). The UPF 502 may maintain the second data packet in the buffer for a holding time until a time at which the UPF 502 may deliver the second data packet, for example, following the end time of the second delivery time window 523.

At 570, the UPF 502 may deliver to the data network 501, and the data network 501 may receive from the UPF 502, the second data packet. As shown, the application 505 delivers the second data packet at the beginning of the third delivery opportunity 532 following the end time of the second delivery time window 523.

At 572, the UE 115-*b* may identify a third data packet to be transmitted to the UPF 502. The UE 115-*b* may, for example, receive the third data packet from the core network, the third data packet 550 including information for the data network 501.

At 574, the UE 115-*b* may transmit to the UPF 502 via the base station 105-*b*, and the UPF 502 may receive from the UE 115-*b*, the third data packet, as may have been identified at 572. In this example, the transmission of the third data packet may encounter interference or blockage, or otherwise may not be successfully received at the UPF 502 such that the UPF 502 is able to decode sufficient information from the third data packet (e.g., based on a threshold).

At 576, the base station 105-*b* may transmit to the UE 115-*b*, and the UE 115-*b* may receive from the base station 105-*b*, a negative acknowledgement. The negative acknowledgment may indicate, for example, that the third data packet was not successfully received at 574.

At 578, the UE 115-*b* may retransmit to the UPF 502 via the base station 105-*b*, and the UPF 502 may receive from the UE 115-*b*, the third data packet, as may have been identified at 572. The UE 115-*b* may retransmit the third data packet based on having received the negative acknowledgement from the UPF 502 at 576. As shown, the UPF 502 receives the third data packet before the fourth delivery opportunity 542, where the fourth delivery opportunity 542 is based on the packet delivery time window configuration. In some cases, the first data packet may of a traffic type of the traffic type for which the packet delivery time window configuration may have been identified.

At 580, the UPF 502 may delay transmission of the third data packet based on the packet delivery time window configuration and having received third first data packet before the fourth delivery opportunity 542. In some cases, the UPF 502 may buffer the third data packet, as may have been received in the retransmission at 578. In some cases, the UPF 502 may buffer the third data packet before transmitting the third data packet based on having received the third data packet during the third delivery time window 533 before an upcoming delivery opportunity (e.g., the fourth delivery opportunity 542). The UPF 502 may maintain the third data packet in the buffer for a holding time until a time at which the UPF 502 may deliver the third data packet, for example, following the end time of the third delivery time window 533. As shown in this example, the holding time that the third data packet is relatively shorter than the holding time for the first, second, and fourth data packets due to the UPF 502 having received the third data packet in the retransmission at 578.

At 582, the UPF 502 may deliver to the data network 501, and the data network 501 may receive from the UPF 502, the third data packet. As shown, the application 505 delivers the third data packet at the beginning of the fourth delivery opportunity 542 following the end time of the third delivery time window 533.

At 584, the UE 115-b may identify a fourth data packet to be transmitted to the UPF 502. The UE 115-b may, for example, receive the fourth data packet from the core network, the fourth data packet including information for the data network 501. In this example, the UE 115-b may receive the fourth data packet relatively earlier than the other data packets with respect to the fourth period 540. As shown, the UE 115-b identifies the fourth data packet during a time that overlaps with the third period 530.

At 586, the UE 115-b may transmit to the UPF 502 via the base station 105-b, and the UPF 502 may receive from the UE 115-b, the fourth data packet, as may have been identified at 584. Because, in this example, the fourth data packet was received early, the UPF 502 receives the fourth data packet during the fourth delivery time window 543. As the UPF 502 receives the fourth data packet during the fourth delivery time window 543, rather than during a delivery opportunity, the UPF 502 may not deliver the fourth data packet to the data network 501.

At 588, the base station 105-b may transmit to the UE 115-b, and the UE 115-b may receive from the base station 105-b, an acknowledgement. The acknowledgment may indicate, for example, that the fourth data packet was successfully received at 586.

At 590, the UPF 502 may buffer the fourth data packet, as may have been received at 588. The UPF 502 may maintain the fourth data packet in the buffer for a holding time until a time at which the UPF 502 may deliver the second data packet. However, as in this example, the UPF 502 receives the fourth data packet during the fourth delivery time window 543, rather than during a delivery opportunity, the UPF 502 may not deliver the fourth data packet to the data network 501. In this case, the UPF 502 may, for example, discard the fourth data packet to clear the packet from the buffer.

At 592, the UPF 502 may not deliver the fourth data packed to the data network 501. In this example, the UPF 502 receives the fourth data packet during the fourth delivery time window 543, rather than during a delivery opportunity, and thus the UPF 502 may not deliver the fourth data packet to the data network 501. Therefore, the data network 501 may not receive the fourth data packet at this point.

Figure 6:
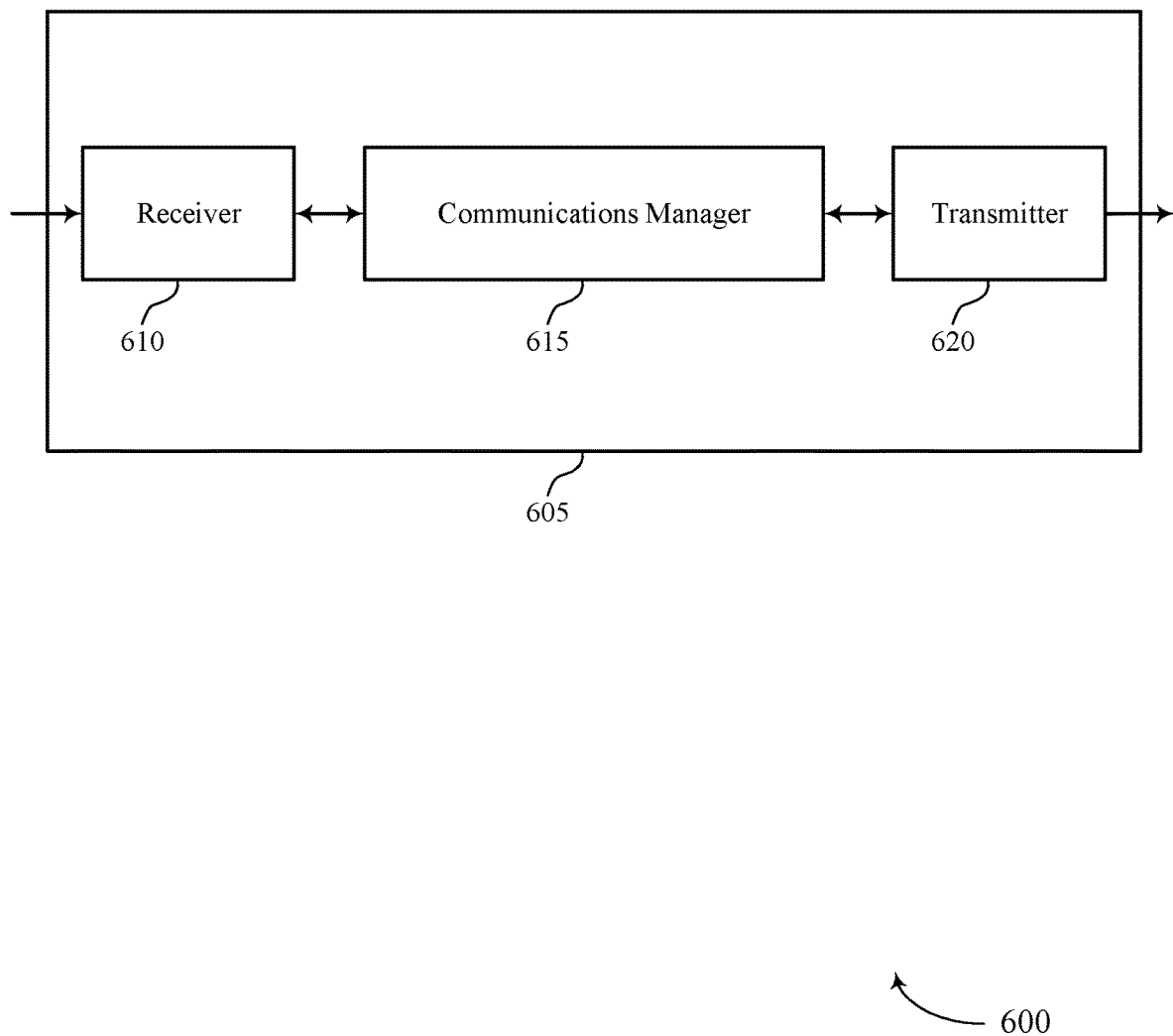
FIGS. 6 and 7 show block diagrams of devices that support delivery time windows for low latency communications in accordance with aspects of the present disclosure.

FIG. 6 shows a block diagram 600 of a device 605 that supports delivery time windows for low latency communications in accordance with aspects of the present disclosure. The device 605 may be an example of aspects of a network entity as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to delivery time windows for low latency communications, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may identify a packet delivery time window configuration for communications of a traffic type, receive, before a delivery opportunity that is based on the packet delivery time window configuration, a data packet of the traffic type, delay transmission of the data packet based on the packet delivery time window configuration and receiving the data packet before the delivery opportunity, and transmit, after delaying transmission and based on the delivery opportunity, the data packet to a network device. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 640 may transmit signals generated by other components of the device 605. In some examples, the transmitter 640 may be collocated with a receiver 610 in a transceiver module. For example, the transmitter 640 may be an example of aspects of the transceiver 920 described with reference to FIG. 9. The transmitter 640 may utilize a single antenna or a set of antennas.

In some examples, the communications manager 615 may be implemented as an integrated circuit or chipset for a mobile device modem, and the receiver 610 and transmitter 620 may be implemented as analog components (e.g., amplifiers, filters, antennas) coupled with the mobile device modem to enable wireless transmission and reception over one or more bands.

The communications manager 615 as described herein may be implemented to realize one or more potential advantages. One implementation may allow the device 605 to support delivery time windows for low latency communications. The device 605 may identify a packet delivery window configuration and delay a transmission for at least part of the respective delivery window. This delay may increase reliability and reduce signaling overhead.

Based on techniques for implementing support for delivery time windows for low latency communications as described herein, a processor of a UE 115 (e.g., controlling the receiver 610, the transmitter 620, or the transceiver 920 as described with reference to FIG. 9) may increase reliability and decrease signaling overhead during delivery time windows with low latency communications because the UE 115 may avoid sending unnecessary transmissions.

Figure 7:
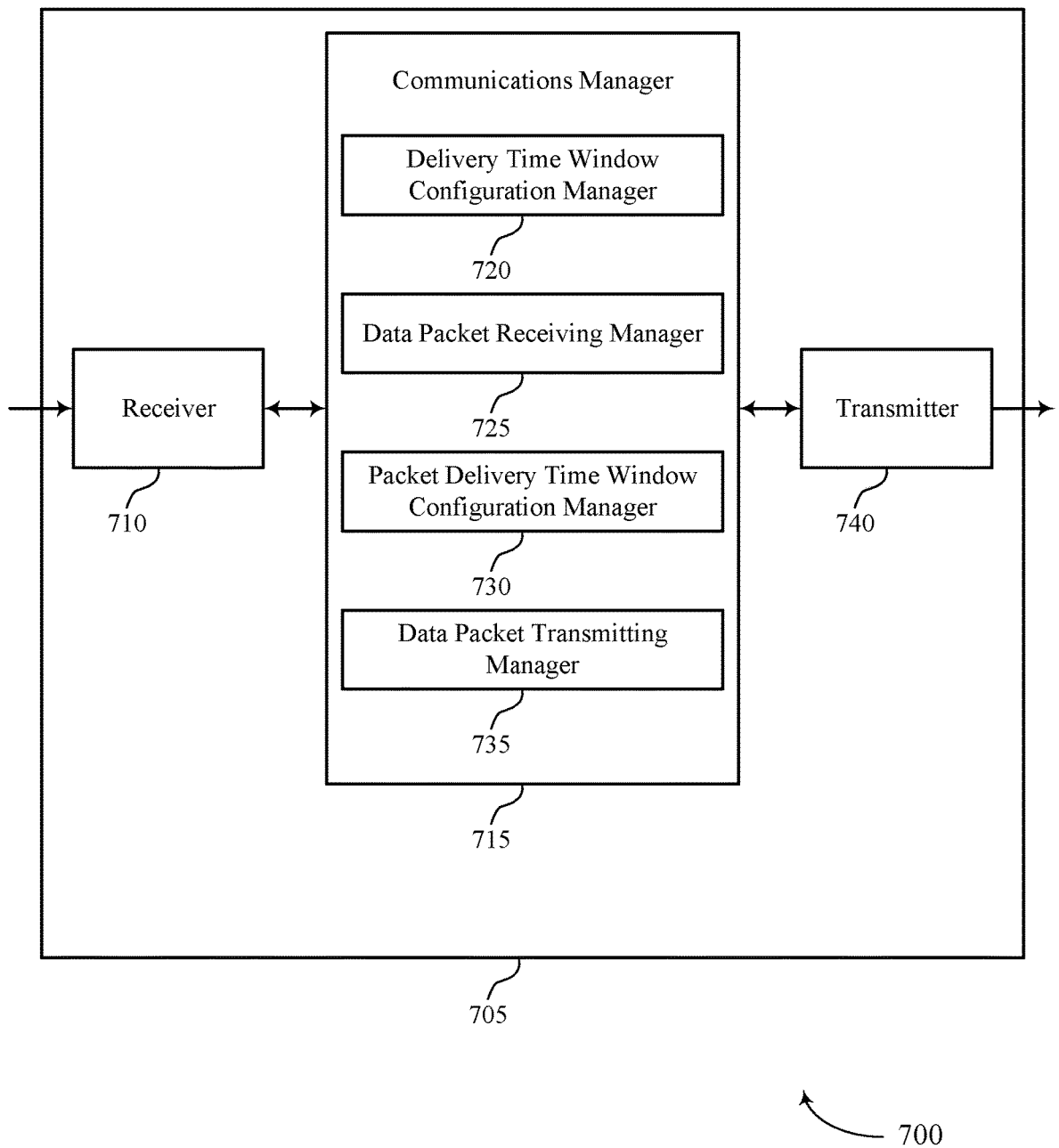

FIG. 7 shows a block diagram 700 of a device 705 that supports delivery time windows for low latency communications in accordance with aspects of the present disclosure. The device 705 may be an example of aspects of a device 605 or a network entity as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to delivery time windows for low latency communications, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a delivery time window configuration manager 720, a data packet receiving manager 725, a packet delivery time window configuration manager 730, and a data packet transmitting manager 735. The communications manager 715 may be an example of aspects of the communications manager 910 described herein.

The delivery time window configuration manager 720 may identify a packet delivery time window configuration for communications of a traffic type.

The data packet receiving manager 725 may receive, before a delivery opportunity that is based on the packet delivery time window configuration, a data packet of the traffic type.

The packet delivery time window configuration manager 730 may delay transmission of the data packet based on the packet delivery time window configuration and receiving the data packet before the delivery opportunity.

The data packet transmitting manager 735 may transmit, after delaying transmission and based on the delivery opportunity, the data packet to a network device.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

In some examples, the communications manager 715 may be implemented as an integrated circuit or chipset for a mobile device modem, and the receiver 710 and transmitter 740 may be implemented as analog components (e.g., amplifiers, filters, antennas) coupled with the mobile device modem to enable wireless transmission and reception over one or more bands.

The communications manager 715 as described herein may be implemented to realize one or more potential advantages. One implementation may allow the device 705 to support delivery time windows for low latency communications. The device 705 may identify a packet delivery window configuration and delay a transmission for at least part of the respective delivery window. This delay may increase reliability and reduce signaling overhead.

Based on techniques for implementing support for delivery time windows for low latency communications as described herein, a processor of a UE 115 (e.g., controlling the receiver 710, the transmitter 740, or the transceiver 920 as described with reference to FIG. 9) may increase reliability and decrease signaling overhead during delivery time windows with low latency communications because the UE 115 may avoid sending unnecessary transmissions.

Figure 8:
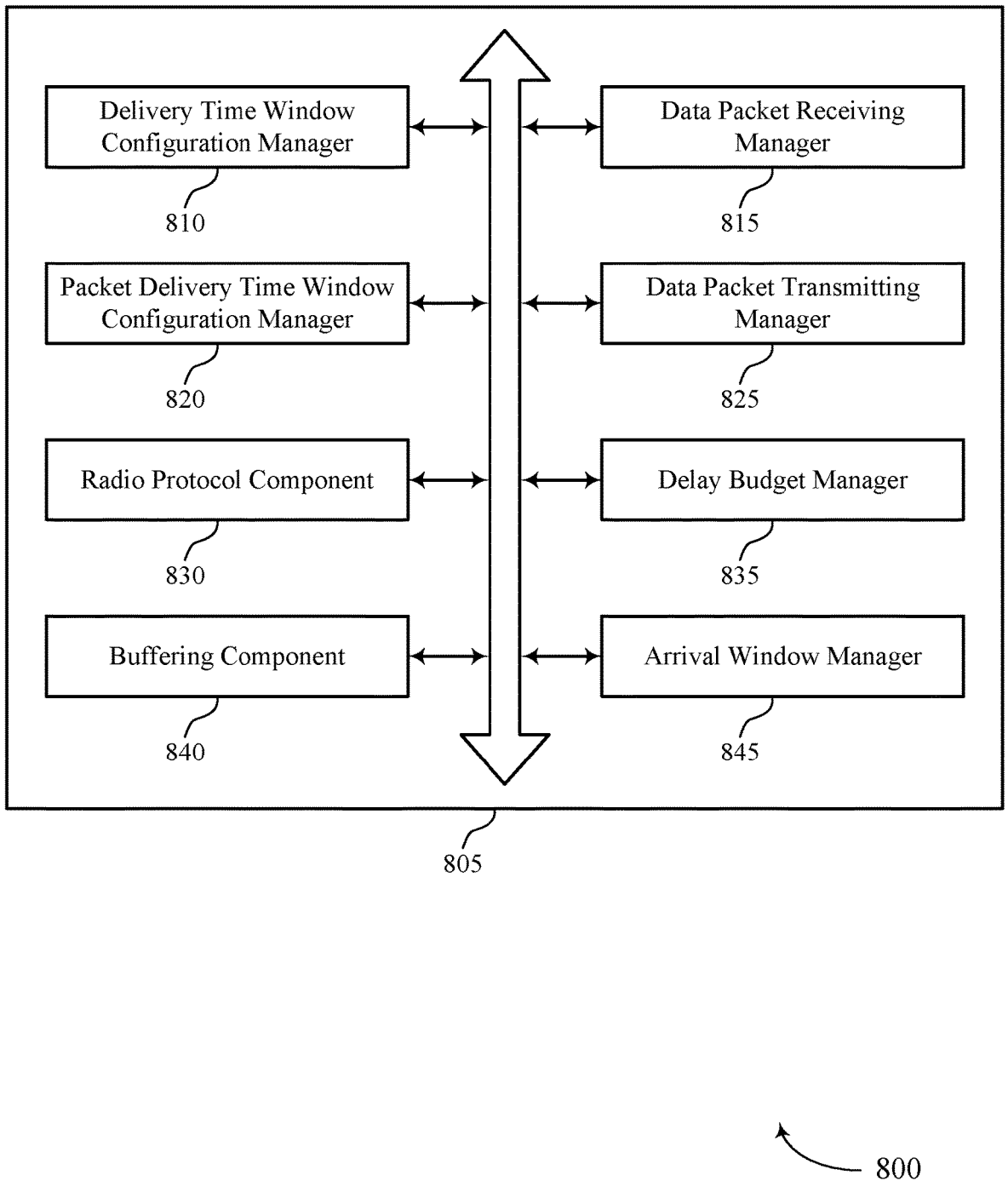
FIG. 8 shows a block diagram of a communications manager that supports delivery time windows for low latency communications in accordance with aspects of the present disclosure.

FIG. 8 shows a block diagram 800 of a communications manager 805 that supports delivery time windows for low latency communications in accordance with aspects of the present disclosure. The communications manager 805 may be an example of aspects of a communications manager 615, a communications manager 715, or a communications manager 910 described herein. The communications manager 805 may include a delivery time window configuration manager 810, a data packet receiving manager 815, a packet delivery time window configuration manager 820, a data packet transmitting manager 825, a radio protocol component 830, a delay budget manager 835, a buffering component 840, and an arrival window manager 845. Each of these modules may communicate, directly or indirectly, with one another (e.g., via one or more buses).

The delivery time window configuration manager 810 may identify a packet delivery time window configuration for communications of a traffic type. In some examples, the delivery time window configuration manager 810 may determine a delivery time window based on the packet delivery time window configuration, where transmitting the data packet is based on the delivery time window. In some examples, determining a time interval associated with the delivery opportunity based on an end time of the delivery time window, where transmitting the data packet includes.

In some examples, the delivery time window configuration manager 810 may receive, from a radio access node, an indication of a periodicity of the delivery time window, a start time of the delivery time window, an end time of the delivery time window, an offset of the delivery time window relative to a time, or a duration of the delivery time window, or any combination thereof, where determining the delivery time window is based on receiving the indication.

In some examples, the delivery time window configuration manager 810 may determine the delivery opportunity based on a delay budget, where transmitting the data packet is based on determining the delivery opportunity. In some examples, the delivery time window configuration manager 810 may determine a delivery time window for communications of the traffic type based on the delay budget, where transmitting the data packet is based on the delivery time window. In some cases, the packet delivery time window configuration indicates a periodicity of the delivery time window, a start time of the delivery time window, an end time of the delivery time window, an offset of the delivery time window relative to a time, or a duration of the delivery time window, or any combination thereof.

The data packet receiving manager 815 may receive, before a delivery opportunity that is based on the packet delivery time window configuration, a data packet of the traffic type. In some examples, the data packet receiving manager 815 may receive the data packet within the delivery time window.

The packet delivery time window configuration manager 820 may delay transmission of the data packet based on the packet delivery time window configuration and receiving the data packet before the delivery opportunity. In some examples, the packet delivery time window configuration manager 820 may determine the delivery opportunity based on an end duration of the packet arrival window, where transmitting the data packet is based on determining the delivery opportunity.

The data packet transmitting manager 825 may transmit, after delaying transmission and based on the delivery opportunity, the data packet to a network device. In some examples, the data packet transmitting manager 825 may transmit the data packet within a time interval of the delivery opportunity. In some examples, the data packet transmitting manager 825 may transmit the data packet within a delivery window of a set of delivery windows associated with communications of the traffic type. In some examples, the data packet transmitting manager 825 may transmit the data packet during an end portion of a delivery window based on the packet delivery time window configuration. In some examples, the data packet transmitting manager 825 may transmit the data packet before or after the delivery opportunity.

The radio protocol component 830 may receive the indication via a radio protocol message.

The delay budget manager 835 may determine a delay budget associated with communications of the traffic type.

The buffering component 840 may buffer the data packet before transmission based on the receiving the data packet before the delivery opportunity.

The arrival window manager 845 may identify a packet arrival window associated with the network device. In some examples, the arrival window manager 845 may receive a packet arrival time window configuration indicating at least one of a UPF packet arrival time window configuration, a radio access network (RAN) packet arrival time window configuration, or a UE packet arrival time window configuration, where determining the delivery opportunity is based on receiving the packet arrival time window configuration. In some examples, the arrival window manager 845 may determine the delivery opportunity based on a packet arrival time associated with the network device and a delay budget for communications of the traffic type, where transmitting the data packet is based on determining the delivery opportunity.

Figure 9:
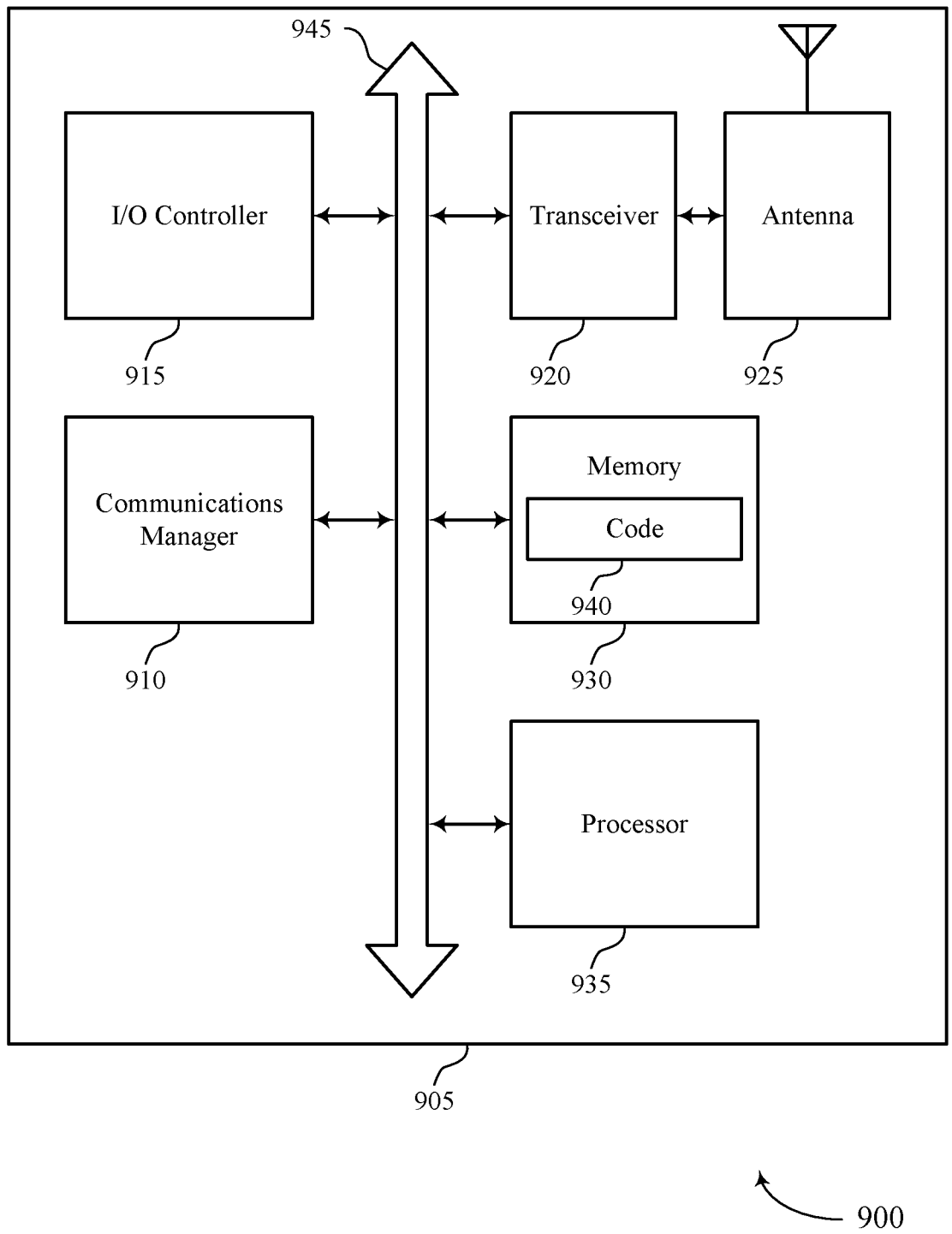
FIG. 9 shows a diagram of a system including a device that supports delivery time windows for low latency communications in accordance with aspects of the present disclosure.

FIG. 9 shows a diagram of a system 900 including a device 905 that supports delivery time windows for low latency communications in accordance with aspects of the present disclosure. The device 905 may be an example of or include the components of device 605, device 705, or a network entity as described herein. The device 905 may include components for bi-directional voice and data communications including components for transmitting and receiving communications, including a communications manager 910, an I/O controller 915, a transceiver 920, an antenna 925, memory 930, and a processor 935. These components may be in electronic communication via one or more buses (e.g., bus 945).

The communications manager 910 may identify a packet delivery time window configuration for communications of a traffic type, receive, before a delivery opportunity that is based on the packet delivery time window configuration, a data packet of the traffic type, delay transmission of the data packet based on the packet delivery time window configuration and receiving the data packet before the delivery opportunity, and transmit, after delaying transmission and based on the delivery opportunity, the data packet to a network device.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touch-screen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 940 including instructions that, when executed, cause the processor to perform various functions described herein. In some cases, the memory 930 may contain, among other things, a Basic Input/Output System (BIOS) which may control basic hardware or software operation such as the interaction with peripheral components or devices.

The processor 935 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 935 may be configured to operate a memory array using a memory controller. In other cases, a memory controller may be integrated into the processor 935. The processor 935 may be configured to execute computer-readable instructions stored in a memory (e.g., the memory 930) to cause the device 905 to perform various functions (e.g., functions or tasks supporting delivery time windows for low latency communications).

The code 940 may include instructions to implement aspects of the present disclosure, including instructions to support wireless communications. The code 940 may be stored in a non-transitory computer-readable medium such as system memory or other type of memory. In some cases, the code 940 may not be directly executable by the processor 935 but may cause a computer (e.g., when compiled and executed) to perform functions described herein.

Figure 10:
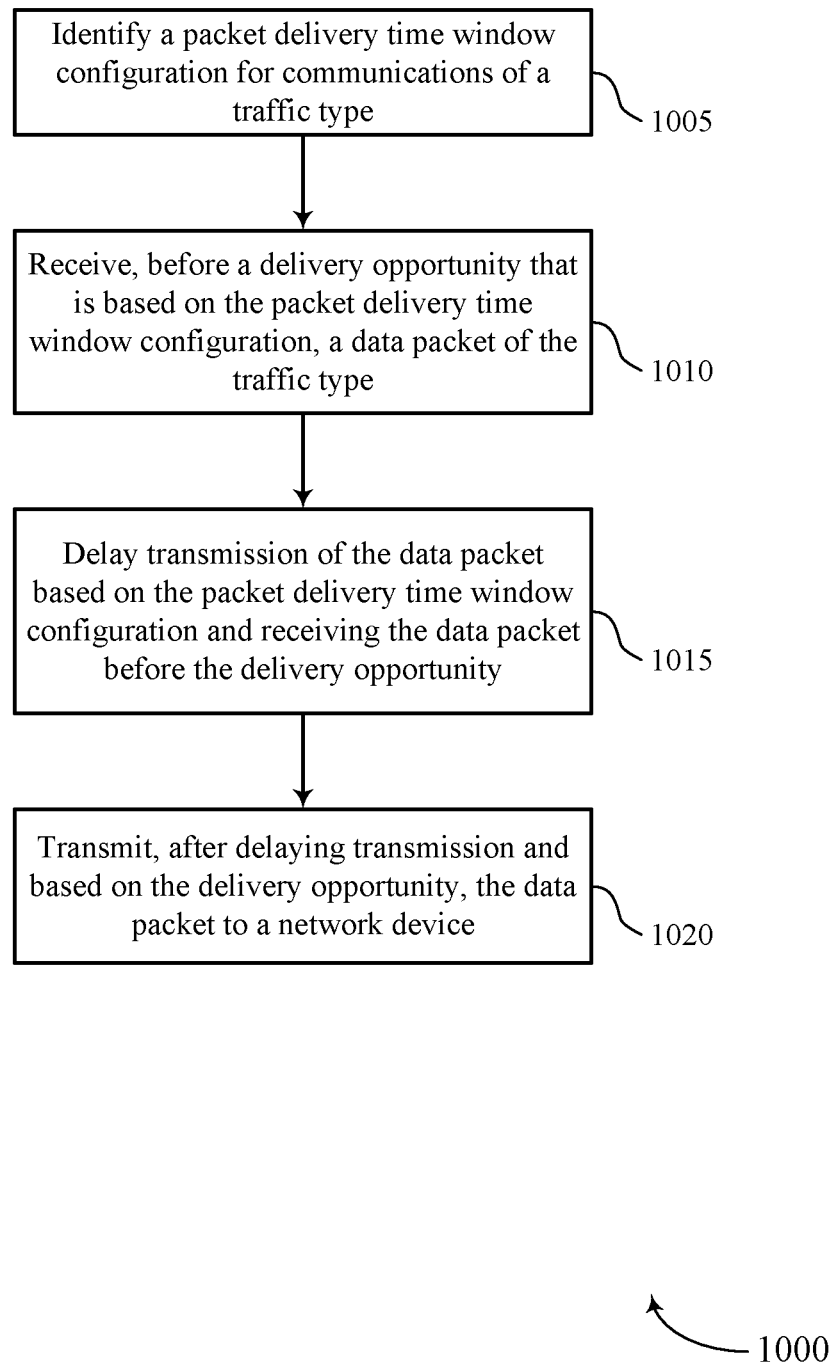
FIGS. 10 through 12 show flowcharts illustrating methods that support delivery time windows for low latency communications in accordance with aspects of the present disclosure.

FIG. 10 shows a flowchart illustrating a method 1000 that supports delivery time windows for low latency communications in accordance with aspects of the present disclosure. The operations of method 1000 may be implemented by a network entity or its components as described herein. For example, the operations of method 1000 may be performed by a communications manager as described with reference to FIGS. 6 through 9. In some examples, a network entity may execute a set of instructions to control the functional elements of the network entity to perform the functions described herein. Additionally or alternatively, a network entity may perform aspects of the functions described herein using special-purpose hardware.

At 1005, the network entity may identify a packet delivery time window configuration for communications of a traffic type. The operations of 1005 may be performed according to the methods described herein. In some examples, aspects of the operations of 1005 may be performed by a delivery time window configuration manager as described with reference to FIGS. 6 through 9.

At 1010, the network entity may receive, before a delivery opportunity that is based on the packet delivery time window configuration, a data packet of the traffic type. The operations of 1010 may be performed according to the methods described herein. In some examples, aspects of the operations of 1010 may be performed by a data packet receiving manager as described with reference to FIGS. 6 through 9.

At 1015, the network entity may delay transmission of the data packet based on the packet delivery time window configuration and receiving the data packet before the delivery opportunity. The operations of 1015 may be performed according to the methods described herein. In some examples, aspects of the operations of 1015 may be performed by a packet delivery time window configuration manager as described with reference to FIGS. 6 through 9.

At 1020, the network entity may transmit, after delaying transmission and based on the delivery opportunity, the data packet to a network device. The operations of 1020 may be performed according to the methods described herein. In some examples, aspects of the operations of 1020 may be performed by a data packet transmitting manager as described with reference to FIGS. 6 through 9.

In the wireless communications system (e.g., carrying TSN communications), a QoS requirement for a particular QoS flow may define a target PDB. The target PDB may set a target latency or total time delay for communications between a UE and the core network of the wireless communications system below which communicated data packets may be used. In the case of a downlink transmission, the PDB may include a first delay component incurred between the core network. The PDB may also include a second delay component incurred between the base station and the UE. Together, this total PDB defines a target latency from the UPF to the UE via the base station. The PDB may similarly define a target latency from the UE to the UPF or SMF via the base station in the case of an uplink transmission. If the total delay in communicating a data packet exceeds the total PDB defined by the PDB configuration, the data packet may not be used and may be ignored.

In some situations, however, jitter in the wireless communications system may cause the total delay to vary for communications between the UE, base station, UPF, among the other devices in the wireless communications system. In some cases, jitter may cause transmissions to be received by a receiving device (e.g., the UE, or another device within the wireless communications system) earlier than the transmission is expected to be received. However, a transmission that is received early may be received during a packet delivery window for which the receiving device delays data transmissions until the end of the packet delivery window. Thus, transmissions received early due to jitter may cause a queue of transmissions to be transmitted at the end of the packet delivery window. This may reduce the efficiency (e.g., utilization of time and frequency resources) with which these transmissions may be communicated.

Accordingly the method 1000 provide for determining or receiving signaling at a receiving device a packet delivery time window configuration that indicates delivery windows within which transmissions may be held and/or delivery opportunities within which communications are expected to be transmitted. For example, the device may identify a packet delivery time window configuration for communications with another device. Based on the identified packet delivery time window configuration, the device may delay transmission of the data packet for the duration of one or more configured delivery windows. For example, when the device receives a data packet within the duration of one of the delivery windows, the device may delay the data packet for the duration of the respective delivery window. At, for example, the end of the respective delivery window, the device may deliver the data packet to a network device for which the information of the data packet is to be used (e.g., a UE may deliver a held data packet containing application data from a model of the UE to a corresponding application of the UE). By holding these data packet for the duration of the delivery window and transmitting the data packets during the transmission opportunity the UE may set a consistent time period at which it transmits the data packets, thus reducing jitter in the system.

Figure 11:
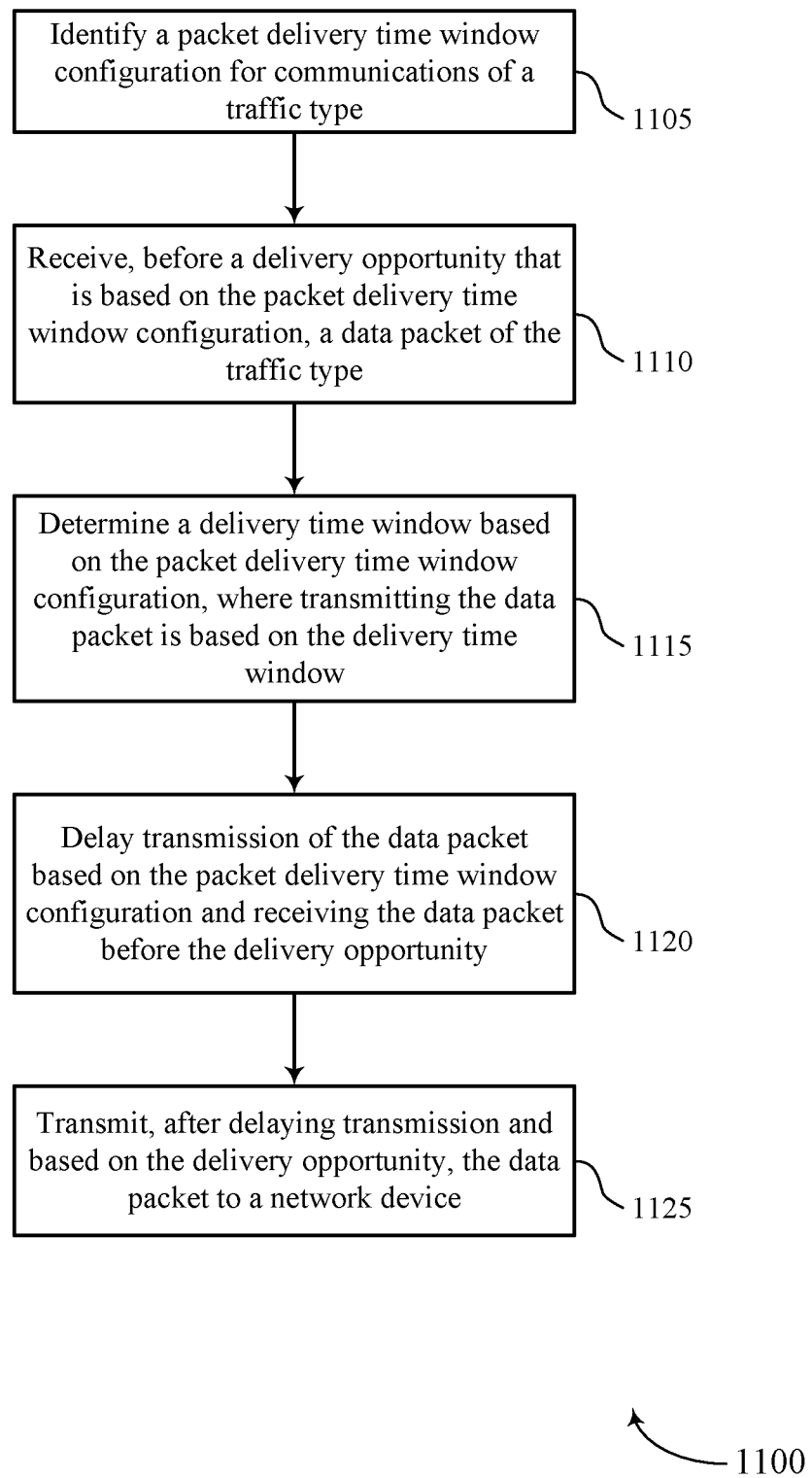

FIG. 11 shows a flowchart illustrating a method 1100 that supports delivery time windows for low latency communications in accordance with aspects of the present disclosure. The operations of method 1100 may be implemented by a network entity or its components as described herein. For example, the operations of method 1100 may be performed by a communications manager as described with reference to FIGS. 6 through 9. In some examples, a network entity may execute a set of instructions to control the functional elements of the network entity to perform the functions described herein. Additionally or alternatively, a network entity may perform aspects of the functions described herein using special-purpose hardware.

At 1105, the network entity may identify a packet delivery time window configuration for communications of a traffic type. The operations of 1105 may be performed according to the methods described herein. In some examples, aspects of the operations of 1105 may be performed by a delivery time window configuration manager as described with reference to FIGS. 6 through 9.

At 1110, the network entity may receive, before a delivery opportunity that is based on the packet delivery time window configuration, a data packet of the traffic type. The operations of 1110 may be performed according to the methods described herein. In some examples, aspects of the operations of 1110 may be performed by a data packet receiving manager as described with reference to FIGS. 6 through 9.

At 1115, the network entity may determine a delivery time window based on the packet delivery time window configuration, where transmitting the data packet is based on the delivery time window. The operations of 1115 may be performed according to the methods described herein. In some examples, aspects of the operations of 1115 may be performed by a delivery time window configuration manager as described with reference to FIGS. 6 through 9.

At 1120, the network entity may delay transmission of the data packet based on the packet delivery time window configuration and receiving the data packet before the delivery opportunity. The operations of 1120 may be performed according to the methods described herein. In some examples, aspects of the operations of 1120 may be performed by a packet delivery time window configuration manager as described with reference to FIGS. 6 through 9.

At 1125, the network entity may transmit, after delaying transmission and based on the delivery opportunity, the data packet to a network device. The operations of 1125 may be performed according to the methods described herein. In some examples, aspects of the operations of 1125 may be performed by a data packet transmitting manager as described with reference to FIGS. 6 through 9.

In the wireless communications system (e.g., carrying TSN communications), a QoS requirement for a particular QoS flow may define a target PDB. The target PDB may set a target latency or total time delay for communications between a UE and the core network of the wireless communications system below which communicated data packets may be used. In the case of a downlink transmission, the PDB may include a first delay component incurred between the core network. The PDB may also include a second delay component incurred between the base station and the UE. Together, this total PDB defines a target latency from the UPF to the UE via the base station. The PDB may similarly define a target latency from the UE to the UPF or SMF via the base station in the case of an uplink transmission. If the total delay in communicating a data packet exceeds the total PDB defined by the PDB configuration, the data packet may not be used and may be ignored.

In some situations, however, jitter in the wireless communications system may cause the total delay to vary for communications between the UE, base station, UPF, among the other devices in the wireless communications system. In some cases, jitter may cause transmissions to be received by a receiving device (e.g., the UE, or another device within the wireless communications system) earlier than the transmission is expected to be received. However, a transmission that is received early may be received during a packet delivery window for which the receiving device delays data transmissions until the end of the packet delivery window. Thus, transmissions received early due to jitter may cause a queue of transmissions to be transmitted at the end of the packet delivery window. This may reduce the efficiency (e.g., utilization of time and frequency resources) with which these transmissions may be communicated.

Accordingly the method 1000 provide for determining or receiving signaling at a receiving device a packet delivery time window configuration that indicates delivery windows within which transmissions may be held and/or delivery opportunities within which communications are expected to be transmitted. For example, the device may identify a packet delivery time window configuration for communications with another device. Based on the identified packet delivery time window configuration, the device may delay transmission of the data packet for the duration of one or more configured delivery windows. For example, when the device receives a data packet within the duration of one of the delivery windows, the device may delay the data packet for the duration of the respective delivery window. At, for example, the end of the respective delivery window, the device may deliver the data packet to a network device for which the information of the data packet is to be used (e.g., a UE may deliver a held data packet containing application data from a model of the UE to a corresponding application of the UE). By holding these data packet for the duration of the delivery window and transmitting the data packets during the transmission opportunity the UE may set a consistent time period at which it transmits the data packets, thus reducing jitter in the system.

Figure 12:
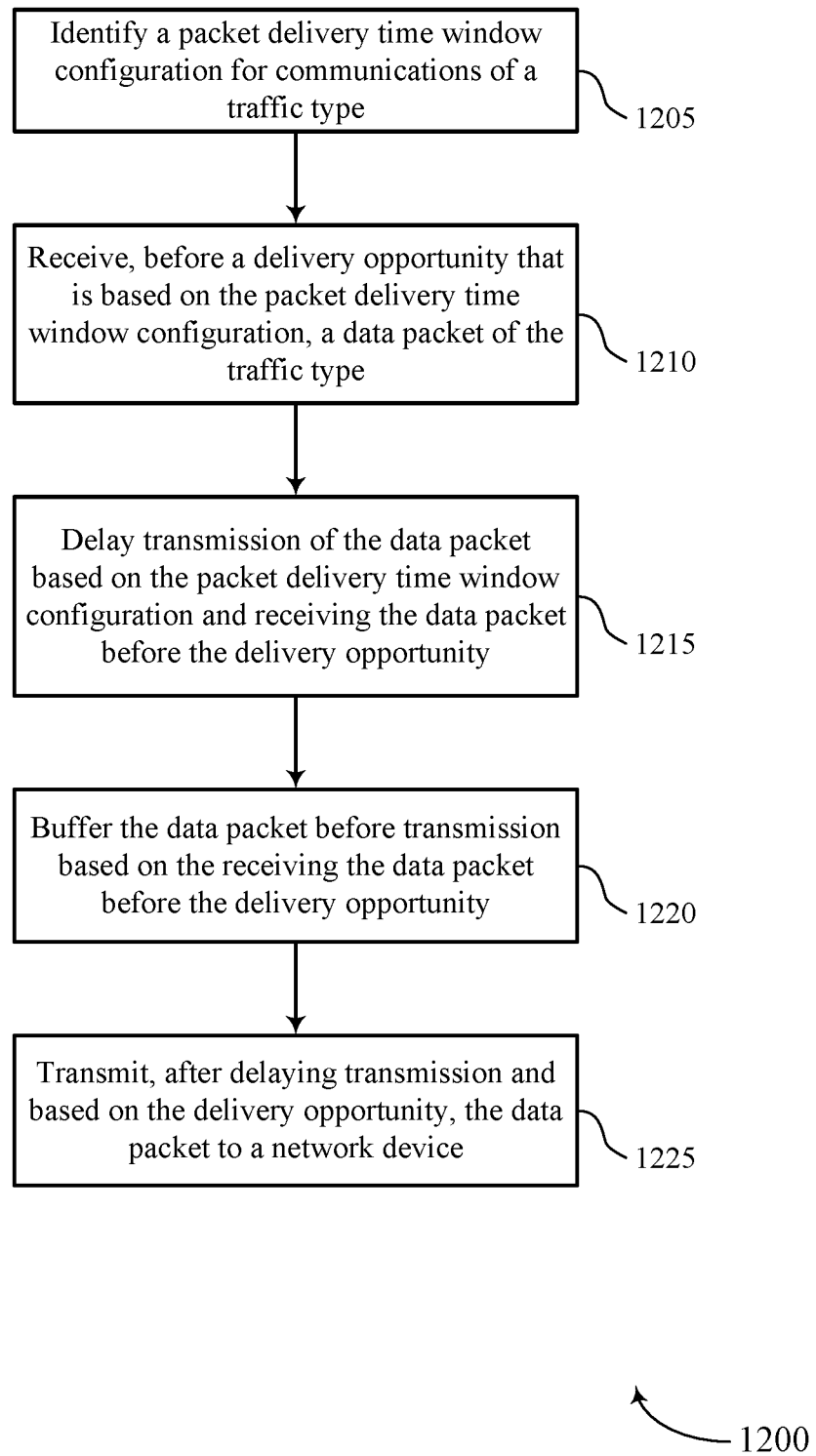

FIG. 12 shows a flowchart illustrating a method 1200 that supports delivery time windows for low latency communications in accordance with aspects of the present disclosure. The operations of method 1200 may be implemented by a network entity or its components as described herein. For example, the operations of method 1200 may be performed by a communications manager as described with reference to FIGS. 6 through 9. In some examples, a network entity may execute a set of instructions to control the functional elements of the network entity to perform the functions described herein. Additionally or alternatively, a network entity may perform aspects of the functions described herein using special-purpose hardware.

At 1205, the network entity may identify a packet delivery time window configuration for communications of a traffic type. The operations of 1205 may be performed according to the methods described herein. In some examples, aspects of the operations of 1205 may be performed by a delivery time window configuration manager as described with reference to FIGS. 6 through 9.

At 1210, the network entity may receive, before a delivery opportunity that is based on the packet delivery time window configuration, a data packet of the traffic type. The operations of 1210 may be performed according to the methods described herein. In some examples, aspects of the operations of 1210 may be performed by a data packet receiving manager as described with reference to FIGS. 6 through 9.

At 1215, the network entity may delay transmission of the data packet based on the packet delivery time window configuration and receiving the data packet before the delivery opportunity. The operations of 1215 may be performed according to the methods described herein. In some examples, aspects of the operations of 1215 may be performed by a packet delivery time window configuration manager as described with reference to FIGS. 6 through 9.

At 1220, the network entity may buffer the data packet before transmission based on the receiving the data packet before the delivery opportunity. The operations of 1220 may be performed according to the methods described herein. In some examples, aspects of the operations of 1220 may be performed by a buffering component as described with reference to FIGS. 6 through 9.

At 1225, the network entity may transmit, after delaying transmission and based on the delivery opportunity, the data packet to a network device. The operations of 1225 may be performed according to the methods described herein. In some examples, aspects of the operations of 1225 may be performed by a data packet transmitting manager as described with reference to FIGS. 6 through 9.

In the wireless communications system (e.g., carrying TSN communications), a QoS requirement for a particular QoS flow may define a target PDB. The target PDB may set a target latency or total time delay for communications between a UE and the core network of the wireless communications system below which communicated data packets may be used. In the case of a downlink transmission, the PDB may include a first delay component incurred between the core network. The PDB may also include a second delay component incurred between the base station and the UE. Together, this total PDB defines a target latency from the UPF to the UE via the base station. The PDB may similarly define a target latency from the UE to the UPF or SMF via the base station in the case of an uplink transmission. If the total delay in communicating a data packet exceeds the total PDB defined by the PDB configuration, the data packet may not be used and may be ignored.

In some situations, however, jitter in the wireless communications system may cause the total delay to vary for communications between the UE, base station, UPF, among the other devices in the wireless communications system. In some cases, jitter may cause transmissions to be received by a receiving device (e.g., the UE, or another device within the wireless communications system) earlier than the transmission is expected to be received. However, a transmission that is received early may be received during a packet delivery window for which the receiving device delays data transmissions until the end of the packet delivery window. Thus, transmissions received early due to jitter may cause a queue of transmissions to be transmitted at the end of the packet delivery window. This may reduce the efficiency (e.g., utilization of time and frequency resources) with which these transmissions may be communicated.

Accordingly the method 1000 provide for determining or receiving signaling at a receiving device a packet delivery time window configuration that indicates delivery windows within which transmissions may be held and/or delivery opportunities within which communications are expected to be transmitted. For example, the device may identify a packet delivery time window configuration for communications with another device. Based on the identified packet delivery time window configuration, the device may delay transmission of the data packet for the duration of one or more configured delivery windows. For example, when the device receives a data packet within the duration of one of the delivery windows, the device may delay and buffer the data packet for the duration of the respective delivery window. At, for example, the end of the respective delivery window, the device may deliver the data packet to a network device for which the information of the data packet is to be used (e.g., a UE may deliver a held data packet containing application data from a model of the UE to a corresponding application of the UE). By buffering these data packet for the duration of the delivery window and transmitting the data packets during the transmission opportunity the UE may set a consistent time period at which it transmits the data packets, thus reducing jitter in the system.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code-division multiple access (CDMA), time-division multiple access (TDMA), frequency-division multiple access (FDMA), orthogonal frequency-division multiple access (OFDMA), single carrier frequency-division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
identifying a packet delivery time window configuration for communications of a traffic type, wherein the packet delivery time window configuration comprises an indication of a delivery time window for communicating one or more data packets;
receiving, during the delivery time window and before a delivery opportunity that are based at least in part on the packet delivery time window configuration, a data packet of the traffic type, wherein the delivery opportunity comprises a time window for communicating the one or more data packets and is based at least in part on a delay budget having a duration greater than zero and associated with communications of the traffic type;
delaying transmission of the data packet in accordance with the delay budget and based at least in part on the packet delivery time window configuration and receiving the data packet before the delivery opportunity and during the delivery time window; and
transmitting, after delaying transmission and based at least in part on the delivery opportunity, the data packet to a network device.

2. The method of claim 1, further comprising:
determining the delivery opportunity based at least in part on the delay budget, wherein transmitting the data packet is based at least in part on determining the delivery opportunity.

3. The method of claim 1, wherein the delay budget is based at least in part on a quality of service parameter.

4. The method of claim 1, further comprising:
determining a delivery time window for communications of the traffic type based at least in part on the delay budget, wherein transmitting the data packet is based at least in part on the delivery time window.

5. The method of claim 1, wherein transmitting the data packet comprises transmitting the data packet before the delivery opportunity.

6. The method of claim 1, wherein transmitting the data packet comprises:
transmitting the data packet within a time interval of the delivery opportunity.

7. The method of claim 6, wherein transmitting the data packet comprises:
transmitting the data packet within a delivery window of a set of delivery windows associated with communications of the traffic type.

8. The method of claim 6, wherein transmitting the data packet comprises:
transmitting the data packet during an end subset comprising an end time of a delivery window based at least in part on the packet delivery time window configuration.

9. The method of claim 1, wherein delaying transmission of the data packet comprises:
buffering the data packet before transmission based at least in part on the receiving the data packet before the delivery opportunity.

10. The method of claim 9, wherein buffering the data packet comprises:
storing the data packet in a buffer for a holding time until the delivery opportunity.

11. The method of claim 1, wherein delaying transmission of the data packet comprises:
a user plane function buffering the data packet before transmission based at least in part on the receiving the data packet before the delivery opportunity.

12. The method of claim 1, further comprising:
determining the delivery opportunity based at least in part on a packet arrival time associated with the network device and the delay budget for communications of the traffic type, wherein transmitting the data packet is based at least in part on determining the delivery opportunity.

13. The method of claim 1, wherein the packet delivery time window configuration is based at least in part on a time sensitive networking system.

14. The method of claim 1, wherein the network device operates in a time sensitive networking system and the communications of the traffic type are in the time sensitive networking system.

15. The method of claim 1, further comprising:
determining a delivery time window based at least in part on the packet delivery time window configuration, wherein transmitting the data packet is based at least in part on the delivery time window.

16. The method of claim 15, further comprising:
determining a time interval associated with the delivery opportunity based at least in part on an end time of the delivery time window, wherein transmitting the data packet comprises transmitting the data packet during the time interval.

17. The method of claim 15, wherein the packet delivery time window configuration indicates a periodicity of the delivery time window, a start time of the delivery time window, an end time of the delivery time window, an offset of the delivery time window relative to a time, or a duration of the delivery time window, or any combination thereof.

18. The method of claim 1, wherein receiving the data packet comprises:
receiving the data packet within a delivery time window.

19. An apparatus for wireless communications, comprising:
a processor,
memory in electronic communication with the processor; and
instructions stored in the memory and executable by the processor to cause the apparatus to:
identify a packet delivery time window configuration for communications of a traffic type, wherein the packet delivery time window configuration comprises an indication of a delivery time window for communicating one or more data packets;
receive, during the delivery time window and before a delivery opportunity that are based at least in part on the packet delivery time window configuration, a data packet of the traffic type, wherein the delivery opportunity comprises a time window for communicating the one or more data packets and is based at least in part on a delay budget having a duration greater than zero and associated with communications of the traffic type;
delay transmission of the data packet in accordance with the delay budget and based at least in part on the packet delivery time window configuration and receiving the data packet before the delivery opportunity and during the delivery time window; and
transmit, after delaying transmission and based at least in part on the delivery opportunity, the data packet to a network device.

20. The apparatus of claim 19, wherein the instructions are further executable by the processor to cause the apparatus to:
determine the delivery opportunity based at least in part on the delay budget, wherein transmitting the data packet is based at least in part on determining the delivery opportunity.

21. The apparatus of claim 19, wherein the delay budget is based at least in part on a quality of service parameter.

22. The apparatus of claim 21, wherein the instructions are further executable by the processor to cause the apparatus to:
determine a delivery time window for communications of the traffic type based at least in part on the delay budget, wherein transmitting the data packet is based at least in part on the delivery time window.

23. The apparatus of claim 19, wherein transmitting the data packet comprises transmitting the data packet before the delivery opportunity.

24. The apparatus of claim 19, wherein the instructions are further executable by the processor to cause the apparatus to:
transmit the data packet within a time interval of the delivery opportunity.

25. The apparatus of claim 24, wherein the instructions are further executable by the processor to cause the apparatus to:
transmit the data packet within a delivery window of a set of delivery windows associated with communications of the traffic type.

26. The apparatus of claim 24, wherein the instructions are further executable by the processor to cause the apparatus to:

transmit the data packet during an end subset comprising an end time of a delivery window based at least in part on the packet delivery time window configuration.

27. The apparatus of claim 19, wherein the instructions are further executable by the processor to cause the apparatus to:

buffer the data packet before transmission based at least in part on the receiving the data packet before the delivery opportunity.

28. The apparatus of claim 19, wherein the network device operates in a time sensitive networking system and the communications of the traffic type are in the time sensitive networking system.

29. An apparatus for wireless communications, comprising:

means for identifying a packet delivery time window configuration for communications of a traffic type, wherein the packet delivery time window configuration comprises an indication of a delivery time window for communicating one or more data packets;

means for receiving, during the delivery time window and before a delivery opportunity that are based at least in part on the packet delivery time window configuration, a data packet of the traffic type, wherein the delivery opportunity comprises a time window for communicating the one or more data packets and is based at least in part on a delay budget having a duration greater than zero and associated with communications of the traffic type;

means for delaying transmission of the data packet in accordance with the delay budget and based at least in part on the packet delivery time window configuration and receiving the data packet before the delivery opportunity and during the delivery time window; and means for transmitting, after delaying transmission and based at least in part on the delivery opportunity, the data packet to a network device.

30. A non-transitory computer-readable medium storing code for wireless communications, the code comprising instructions executable by a processor to:

identify a packet delivery time window configuration for communications of a traffic type, wherein the packet delivery time window configuration comprises an indication of a delivery time window for communicating one or more data packets;

receive, during the delivery time window and before a delivery opportunity that are based at least in part on the packet delivery time window configuration, a data packet of the traffic type, wherein the delivery opportunity comprises a time window for communicating the one or more data packets and is based at least in part on a delay budget having a duration greater than zero and associated with communications of the traffic type;

delay transmission of the data packet in accordance with the delay budget and based at least in part on the packet delivery time window configuration and receiving the data packet before the delivery opportunity and during the delivery time window; and transmit, after delaying transmission and based at least in part on the delivery opportunity, the data packet to a network device.

* * * * *